(12) United States Patent
Savariego et al.

(10) Patent No.: US 12,271,100 B2
(45) Date of Patent: Apr. 8, 2025

(54) SEALED DOME FOR MIXED-MEDIA RECORDING

(71) Applicants: Jacob Savariego, kibbutz Matuva (IL); Eran Shtal, kibbutz Matuva (IL)

(72) Inventors: Jacob Savariego, kibbutz Matuva (IL); Eran Shtal, kibbutz Matuva (IL)

(73) Assignee: Jacob Savariego, Kibbutz Matuva (IL)

( * ) Notice: Subject to any disclaimer, the term of this patent is extended or adjusted under 35 U.S.C. 154(b) by 189 days.

(21) Appl. No.: 17/934,694

(22) Filed: Sep. 23, 2022

(65) Prior Publication Data

US 2023/0089203 A1 Mar. 23, 2023

Related U.S. Application Data

(60) Provisional application No. 63/247,643, filed on Sep. 23, 2021.

(51) Int. Cl.
  *G03B 17/08* (2021.01)
  *G03B 17/55* (2021.01)
  *H04N 23/51* (2023.01)

(52) U.S. Cl.
  CPC ............. *G03B 17/08* (2013.01); *G03B 17/55* (2013.01); *H04N 23/51* (2023.01)

(58) Field of Classification Search
  CPC ........ G03B 17/08; G03B 17/55; G03B 17/56; G03B 17/566; H04N 23/51
  See application file for complete search history.

(56) References Cited

U.S. PATENT DOCUMENTS

2015/0049243 A1* 2/2015 Samuels ................ G03B 17/55
                                                       348/374

FOREIGN PATENT DOCUMENTS

| CN | 204305171 U | * | 4/2015 |
| CN | 105137702 A | * | 12/2015 |
| JP | 09269534 A | * | 10/1997 |

* cited by examiner

*Primary Examiner* — Clayton E. LaBalle
*Assistant Examiner* — Fang-Chi Chang
(74) *Attorney, Agent, or Firm* — POLSINELLI LLP

(57) ABSTRACT

Devices are described herein for extending the use of mobile devices in mixed-media environments. The devices include a transparent hemisphere including a base opposite an apex of the transparent hemisphere and a substantially planar surface configured to be positioned over a circumference of the base of the transparent hemisphere and affixed thereto creating a sealed cavity within the transparent hemisphere. The substantially planar surface includes a transparent portion configured to allow light within an environment to pass through the transparent hemisphere and the transparent portion to reach a recording device.

20 Claims, 16 Drawing Sheets

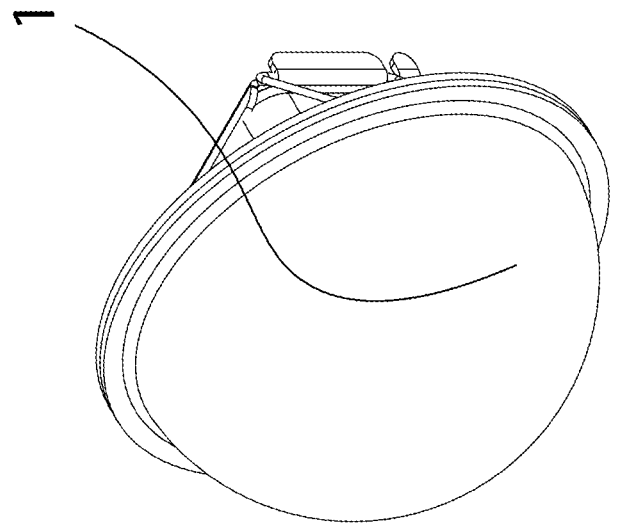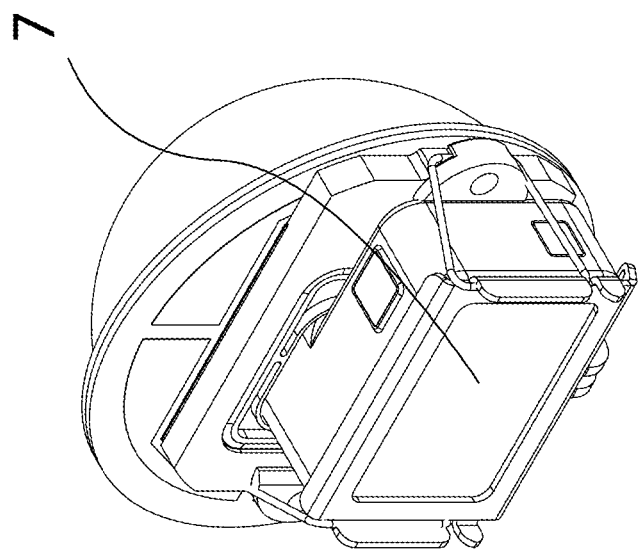
FIG. 1

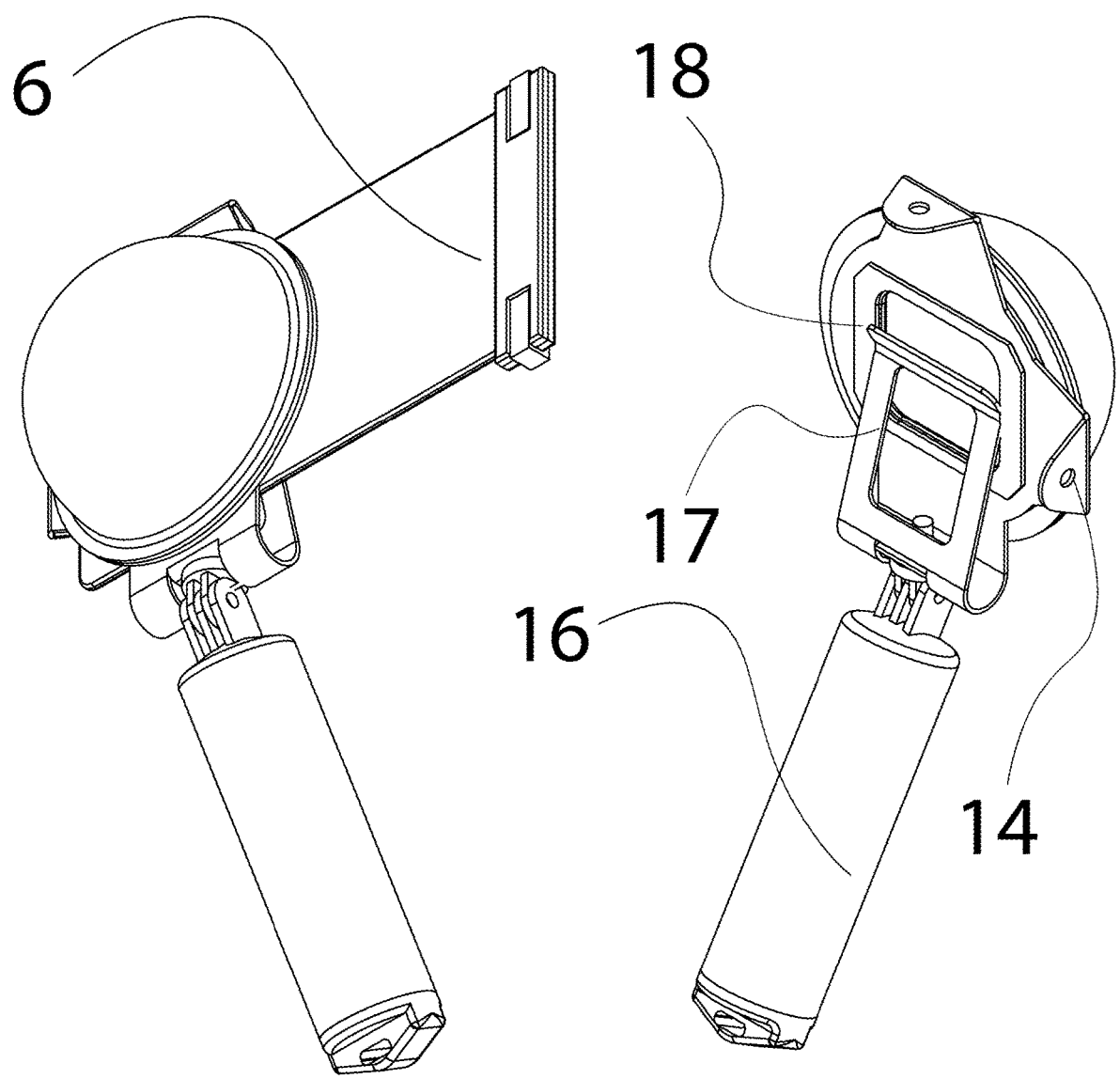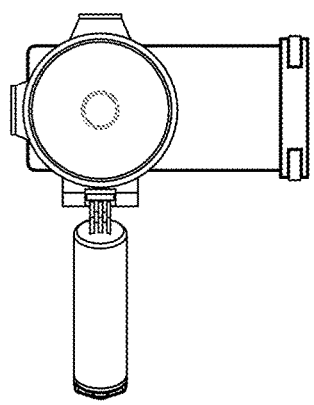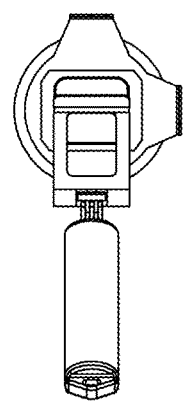
FIG. 12

SEALED DOME FOR MIXED-MEDIA RECORDING

CROSS-REFERENCE TO RELATED APPLICATIONS

The present patent application claims the benefit of priority to U.S. Provisional Patent Application No. 63/247,643 filed Sep. 23, 2021, which is incorporated herein by reference in its entirety for all purposes.

TECHNICAL FIELD

This disclosure relates generally to lenses for recording devices and more particularly to sealed, lenses enabling configured to extend the use of recording devices.

BACKGROUND

Dome lenses may be affixed to a recording device to protect a lens of the recording device and enable the recording device to operate in underwater environments. The dome lens creates an air pocket between the environment and the lens of the recording device. When affixed to the recording device, the airgap between the dome lens and the lens of the recording device allows light to reach a lens of the recording device in a same manner as when operated in an open-air environment.

Existing dome lenses may include a transparent hemisphere and cover positioned over the base of the hemisphere. The cover may include a hole configured to accept the lens of the recording device. Light within the environment may pass through the transparent hemisphere and the hole of dome lens to reach the lens of the camera to allow the camera and reach the lens of the recording device.

SUMMARY

An apparatus is described herein for extending the use of mobile devices in mixed-media environments. The apparatus comprising: a transparent hemisphere including a base opposite an apex of the transparent hemisphere; and a substantially-planar surface configured to be positioned over a circumference of the base of the transparent hemisphere and affixed thereto creating a sealed cavity within the transparent hemisphere, wherein the substantially-planar surface includes a transparent portion configured to allow light within an environment to pass through the transparent dome and the transparent portion to reach a recording device.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 1 illustrates an example sealed-dome lens configured to be affixed to recording device in accordance with aspects of the present disclosure.

FIG. 12 illustrates a recording-device handling system for use in various environments in accordance with aspects of the present disclosure.

DETAILED DESCRIPTION

Figure 2:
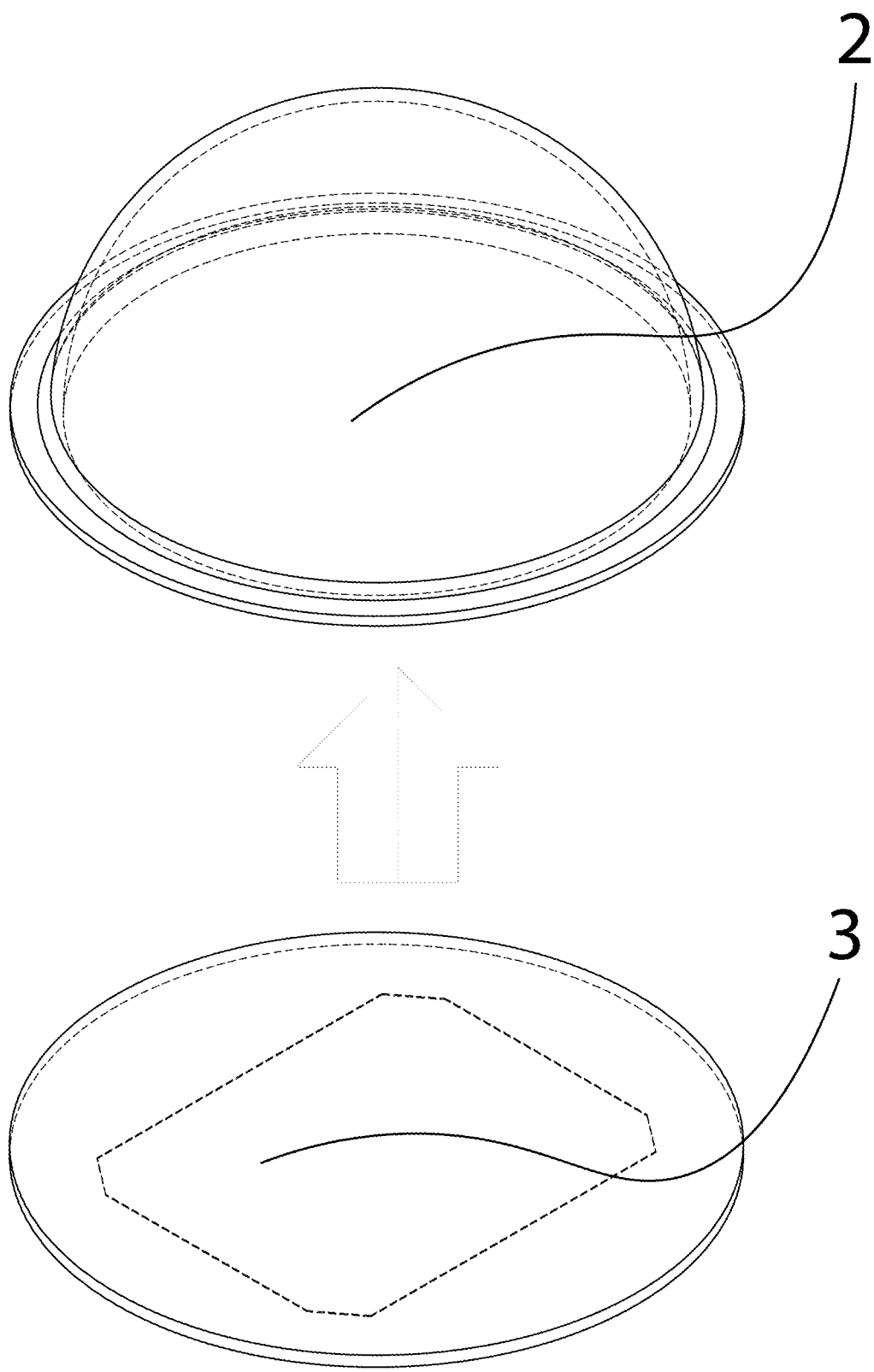
FIG. 2 illustrates a deconstructed view of an example sealed-dome lens in accordance with aspects of the present disclosure.

Air-gapped lenses are described herein for use with recording devices to extend the use of the recording devices within disparate environments. Sealed-dome lenses (also referred to herein as a "closed seal apparatus" or a "sealed dome") can include a transparent lens surface and a backside (e.g., such as a planar surface or substantially planar surface) that together define an airgap or air pocket between the lens surface and the backside. The airgap allows the recording device to capture clear images/video when operating in extreme environments such as underwater. The sealed-dome lens allows light to pass through the lens surface and reach the lens of the recording device in same manner as when operating in an open-air environment.

The transparent lens surface may be of a concave shape. Examples of such concave shapes include, but are not limited to, hemispherical, spherical, cylindrical, other curved shape, cubic, rectangular prism, or the like. The transparent lens surface may be composed of a transparent material such as, but not limited to, acrylic, glass, crystal, etc.

The backside may be affixed to the lens surface so as to create a sealed cavity between the lens surface and the backside. The sealed cavity may further improve the clarity of images/video captured by recording devices by preventing aspects of the environment (e.g., water, temperature, humidity, etc.) from affecting the airgap or features provided by the sealed-dome lens. For example, if water enters the airgap, then the airgap may be eliminated reducing the quality of images/video captured by the recording device and potentially affecting the integrity of the recording device. In humid environments, moisture in the airgap may condense along the inner lens surface causing a fogging effect that may prevent the recording device from capturing images/video. The sealed cavity ensures the dome lens can continue to operate in various environments (e.g., hot, humid, cold, in water, etc.), without impacting the quality of images/video captured by the recording device.

The backside may include a transparent portion configured to allow light to reach the lens of the recording device. In some instances, the transparent portion may include a non-reflective coating (e.g., such anti-reflection filters, single or circular polarization filters, single or multi-layer interference filters, absorption filters, etc.) to improve how light may be received by the lenses of the recording device. In some instances, the transparent portion may be greater than or equal to the size of the lens of the recording device and include. In some instances, the sealed cavity of the transparent lens surface and backside can be provided by manufacturing the transparent lens surface and backside as a single component. In other instances, the transparent lens surface and backside may be separate components. In those instances, the backside may be secured to the transparent lens surface using an adhesive (e.g., such as, but not limited to a double-sided tape, glue, solvent, etc.), a mechanical adherent (e.g., such as, but not limited to screws. clips, clamps, vacuum seal, threads allowing the backside to screw into the transparent outer lens, vacuum seal, etc.), combinations thereof, or the like. The transparent outer lens and/or the backside may include a sealing supplement such as, but not limited to rubber or silicone seal, or the like. (e.g., with or without using a solvent, ultrasonic, heat, etc.). The sealed-dome lens or the component parts (e.g., transparent outer lens and backside, etc.), may be manufactured using any suitable means such as, but not limited to injection molding, vacuum/pressure forming, etc.

The backside may include additional features to increase the efficiency of the dome lens within particular environments. In some instances, the backside may include modular attachment points configured to receive attachments that may provide the additional features. The attachments may be attached or removed to suit the particular environment in which the recording device is intended to operate. In other instances, the backside may be manufactured as a monolithic component comprising a fixed quantity of attachments. In still yet other instances, the backside may be assembled from multiple sub-components that each include zero or more attachments.

The attachments can include, but are not limited to, heatsinks (e.g., configured to manage the temperature of the sealed cavity, non-reflective coatings (e.g., such anti-reflection filters, single or circular polarization filters, single or multi-layer interference filters, absorption filters, etc.) to improve how light may be received by the lenses of the recording device, sensors (e.g., hygrometers, temperature sensors, moisture and/or water sensors, etc.), environmental-control materials (e.g., such as desiccants or other materials configured to maintain characteristics of the sealed cavity such as but not limited to temperature, humidity, moisture or lack thereof, or the like), combinations thereof, or the like.

For example, an absorbent material may be added to the backside to collect excess moisture in the sealed cavity. The absorbent material may be, for example, absorbent cotton, wool pads, silica gel etc. and attached to the internal backside (e.g., facing the transparent outer lens of the apparatus. In some instances, the absorbent material may be attached directly to the internal backside. In other instances, the backside may include a chamber configured to hold the absorbent material. The chamber may be exposed to the sealed cavity. The backside may include opening to the chamber to enable access to the absorbent material (e.g., to determine a saturation of the absorbent material, replace the absorbent material, or the like). The opening may include a sealing mechanism such as a plate or door that may cover the opening and provide seal between the sealed-cavity and the environment.

In another example, in tropical environments the sealed-dome lens may include one or more heatsinks configured to cool the backside by channeling the heat from the sealed cavity to the backside. The heatsinks may prevent moisture in the sealed cavity from creating a fogging effect (e.g., condensing along the transparent outer lens due to the temperature differential between the temperature of the sealed cavity and the temperature outside the sealed cavity), which may impede light from reaching the lens of the recording device. The heat sink may comprise aluminum or any heat transferring material. Alternatively, or additionally, the backside may include a valve configured to allow air to pass into the sealed cavity, but not water. The value may allow the temperature within the sealed cavity to equalize with the temperature outside the sealed cavity preventing the fogging effect.

In still yet another example, a non-reflecting material or surface can be applied to the internal backside or external backside (e.g., the surface of the backside facing away from the transparent outer lens). The non-reflecting material may increase the performance and quality of images/video captured by the recording device by minimizing the reflection of direct and indirect light to the dome lens.

The sealed-dome apparatus may be attached directly to the recording device (if the recording device is waterproof) or to a protective covering of the recording device (e.g., such as a waterproof case, etc.). Alternatively, the sealed-dome device may be attached to a direct view device such as a Prisma mirror periscope or the like. When attached to the recording device, the sealed-dome apparatus may create an air-seal or water-seal around the lens of the recording device (e.g., to prevent water or other particulates from coming between the transparent portion and the lens of the recording device.

FIG. 1 illustrates an example sealed-dome lens configured to be affixed to a recording device in accordance with aspects of the present disclosure. Sealed-dome lens 1 can be attached to recording device 7. In some instances, sealed-dome lens 1 may be attached to a protective cover of the recording device such as, but not limited to, a case, bag, or the like. The recording device may be a camera configured to capture still images and/or video. Sealed-dome lens 1 may include a front lens (e.g., a transparent outer lens or the like), which may be of various sizes and/or shapes. As shown in FIG. 1, the front lens is a spherical dome but may be of any shape configured to create an airgap between the lens of the recording device and the surface of the front lens such as, but not limited to cubes, cuboids, spheres, ellipsoids, cylinders, cones, triangular prisms, hexagonal prisms, etc. The front lens may be made from a solid transparent material (e.g., such as but not limited to glass, plastic, crystal, etc.). The front lens may form a sealed cavity that may be closed to the outside environment so as to prevent moisture, temperature, particulates, etc. from entering the sealed cavity. The backside of the sealed apparatus may include an attachment means for attaching the sealed-dome lens to the recording device. The attachment means is not recording device specific and may be used to attach the sealed-dome lens to a variety of recording device.

FIG. 2 illustrates a deconstructed view of an example sealed-dome lens in accordance with aspects of the present disclosure. Sealed-dome lenses (such as sealed-dome lens 1) may comprise a transparent outer lens 2 and a backside 3 with a transparent portion. Backside 3 may be entirely transparent or may include a non-transparent portion and transparent portion. Light may pass through the transparent outer lens 2, through the transparent portion of backside 3 (through any additional materials between backside 3 and a lens of the recording device) to a lens of the recording device. The size of transparent portion may be selected based on a recording device for which the sealed-dome lens is to be used. In some instances, the size of transparent portion may be selected to be greater than or equal to a variety of recording device lenses to enable the sealed-dome lens to be usable for any of the variety of recording devices. The combined transparent portion and transparent outer lens allows the recording device to capture photos and/or video both in and outside the water.

Backside 3 may made of any of one or more any materials (e.g., plastic, glass, crystal, metal such as aluminum, or the like) provided that the transparent portion remains transparent. Backside 3 may be greater than or equal to the circumference of the transparent outer lens 2. Backside 3 may be sealed to the base of the transparent outer lens using, for example, adhesives, mechanical fixators (e.g., screws, clamps, etc.), or the like.

Backside 3 may include markings to allow the operation of the sealed-dome lens or recording device in water-based environments. For example, the markings may include a reference line to guide a user intending to capture partially submerged images or video (e.g., where part of the captured image includes the underwater environment and part of the captured image includes the above water environment). More than one reference line may be marked on the sealed-dome lens to provide guide a user to capture different types of images and/or video. The markings may block reflections of light from impacting the images/video, which may increase the quality of the images and/or video.

By creating a seal between transparent outer lens 2 and backside 3, the sealed-dome lens may be unaffected by the environment. The seal prevents water, water vaper (e.g., such as humidity, etc.), particulates, etc. from entering the sealed-dome lens and affecting the images or video captured by the recording device.

Figure 3:
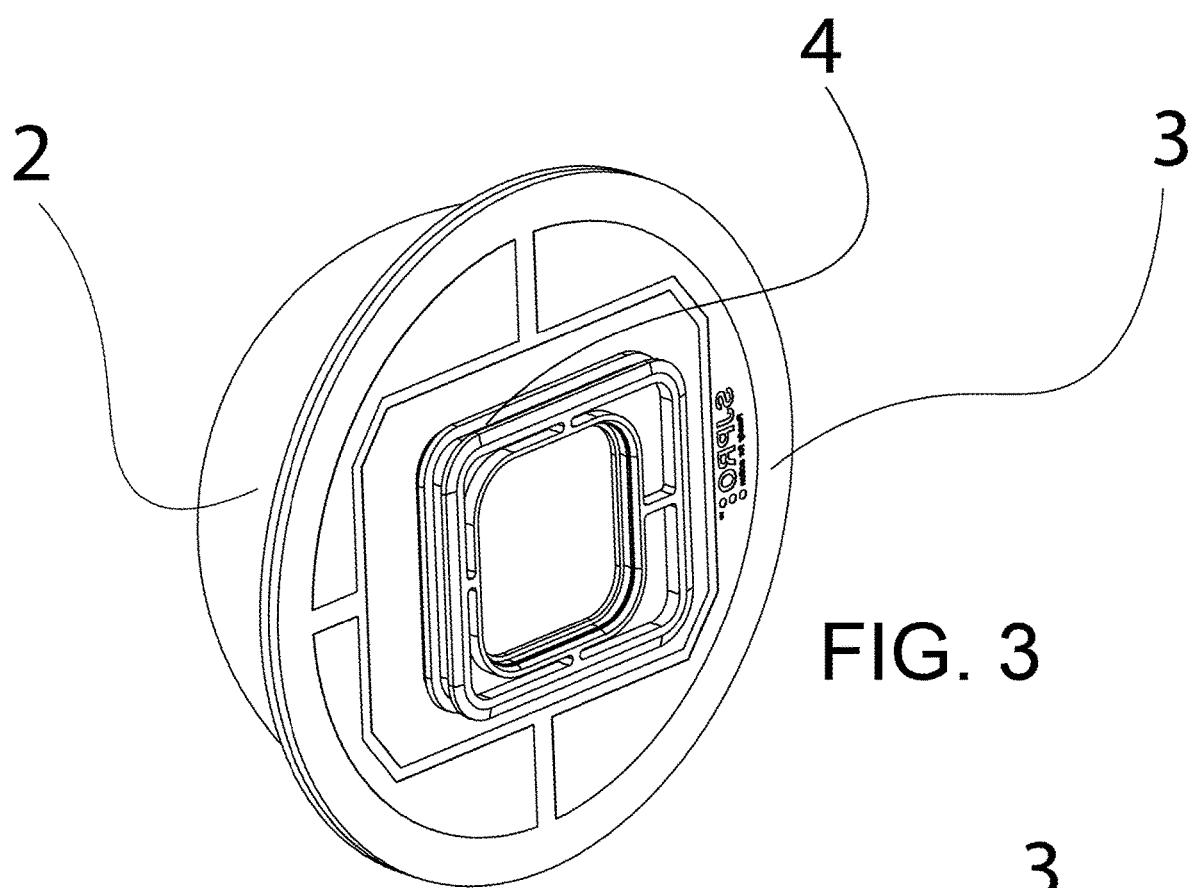
FIG. 3 illustrates an example backside of a sealed-dome lens accordance with aspects of the present disclosure.

FIG. 3 illustrates an example cover of a sealed-dome lens accordance with aspects of the present disclosure. The sealed-dome lens may include a transparent outer lens 2, backside 3 and sealing mechanism 4 to create a waterproof-seal between the sealed-dome lens and the recording device. Attaching the sealed-dome lens to the recording device may depend on the characteristics of the recording device. For example, if the recording device is waterproof, then the sealed-dome lens may be affixed directly to the recording device. If the recording device is not waterproof, then the recording device may be placed into a protective covering (e.g., waterproof case, bag, or the like) and the sealed-dome lens may be affixed to the protective covering of the recording device. The sealed-dome lens may be positioned over the lens of the recording device. Backside 3 may include sealing mechanism 4 (e.g., such as a gasket or the like), that may fit around the lens of the recording device (or over the protective covering of the recording device that is over the lens of the recording device). The sealing mechanism may create watertight seal around the lens of the recording device to prevent water or other particulates from coming between the sealed-dome lens and the lens of lens of the recording device (or the protective covering if present). Sealing mechanism 4 may include an adhesive such that when pressed onto the recording device, the sealing mechanism adheres to the recording device creating the seal. Alternatively, or additionally, other mechanisms may be used to affix the sealed-dome lens to the recording device (e.g., clips, screws, adhesive, etc.).

Figure 4:
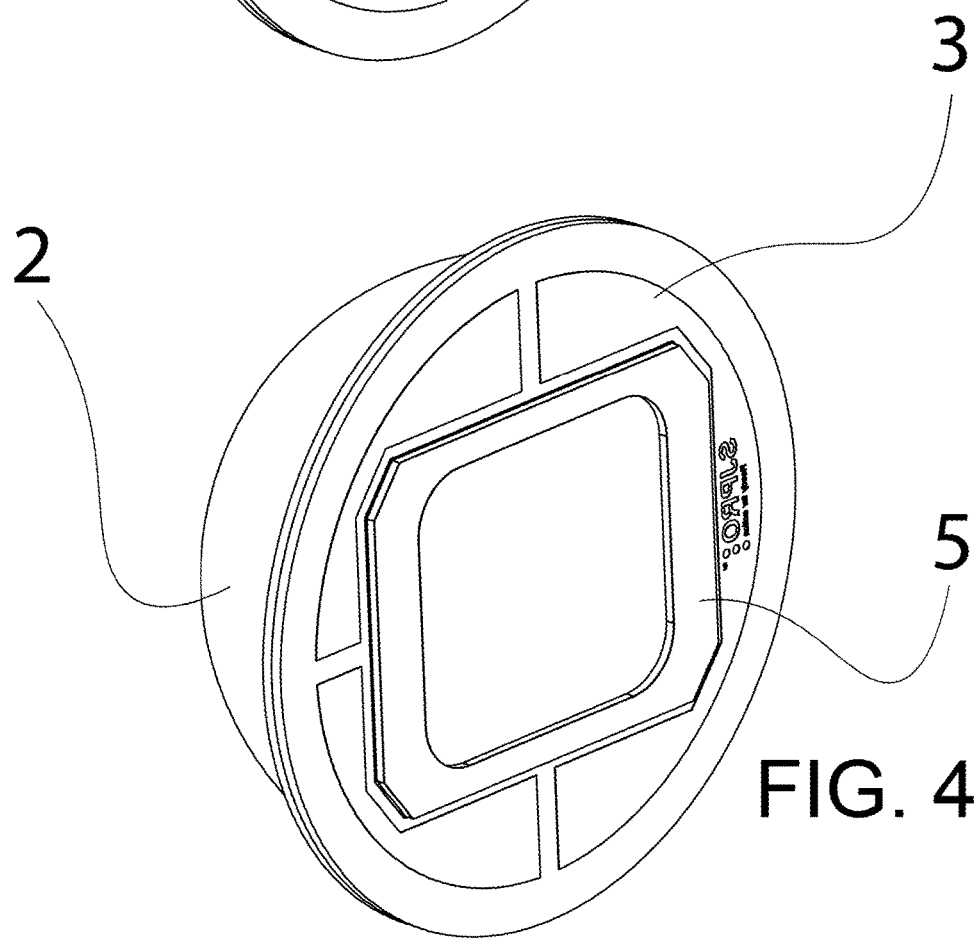
FIG. 4 illustrates another example backside of a sealed-dome apparatus in accordance with aspects of the present disclosure.

FIG. 4 illustrates another example cover of a sealed-dome apparatus in accordance with aspects of the present disclosure. The sealed-dome lens of FIG. 4 includes a double-sided adhesive layer 5 configured to adhere the sealed-dome lens to the recording device (or protective covering). Double-sided adhesive layer 5 may be used in addition to or in place of the sealing mechanism 4. The double-sided adhesive layer may be positioned around the transparent portion of the backside to prevent water, water vaper, and/or particulates from coming between the sealed-dome lens and the lens of the recording device. Alternatively, or additionally, other mechanisms may be used to affix the sealed-dome lens to the recording device (e.g., clips, screws, adhesive, etc.) as previously described.

Figure 5:
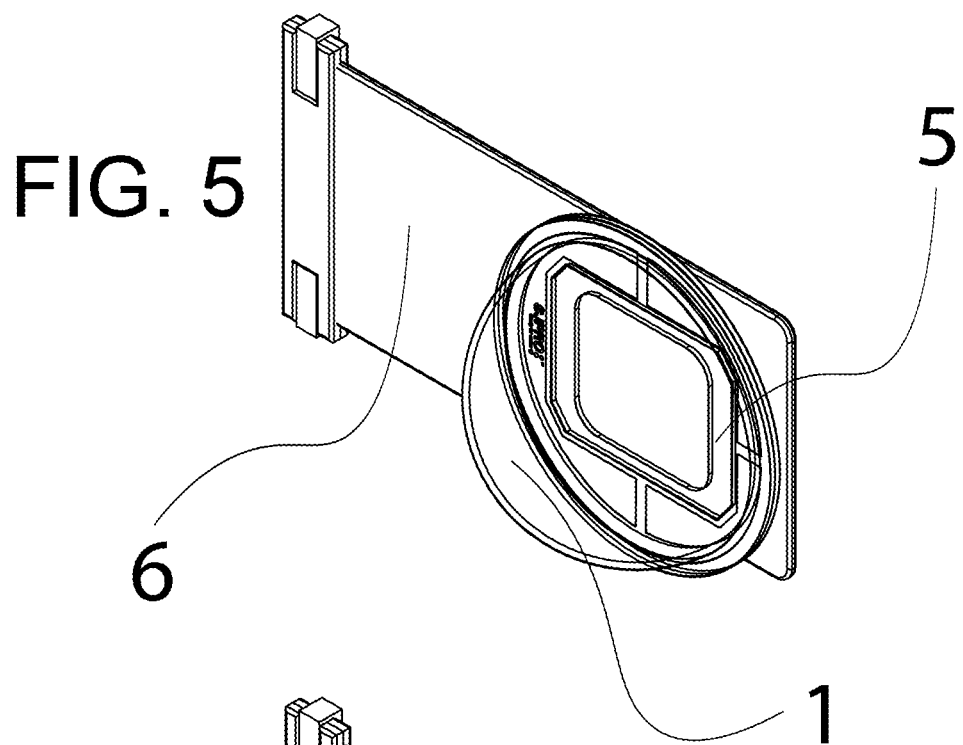
FIG. 5 illustrates an example sealed-dome apparatus affixed to a planar surface in accordance with aspects of the present disclosure.

FIG. 5 illustrates an example sealed-dome apparatus affixed to a planar surface in accordance with aspects of the present disclosure. The sealed-dome lens may be affixed to a variety of materials and surfaces. As shown, the sealed-dome lens is affixed to a planar surface of a protective covering 6. Protective covering 6 may be a protective covering of a recording device that enables use of the recording device underwater or in other environments. The sealed-dome lens may be affixed to the planar surface using double-sided adhesive layer 5. Using double-sided adhesive layer 5, the sealed-dome lens can be positioned at location of the protective covering provided the entirety of double-sided adhesive layer 5 is positioned over the protective covering (e.g., to ensure a proper fitting between the sealed-dome lens and the protective covering, etc.). Double-sealed adhesive layer 5 may shaped as a square (as shown) or in various other forms (e.g., such as a ring, rectangle, or other polygon, etc.). only. Double-sided adhesive layer 5 may include an adhesive material such as a gel, liquid, combinations thereof, or the like. The adhesive material may include water-resistance properties (e.g., such as a hydrophobic material, etc.) to prevent the adhesive material from being affected by water. If the adhesive material lacks water-resistance properties, one or more gaskets may be used in addition or in place of double-sided adhesive layer 5. For example, an inner gasket and outer gasket may be positioned on either side double-sided adhesive layer 5 to prevent moisture from reaching the double-sided adhesive layer 5 and affecting the connection between the sealed-dome lens and the planar surface 6 of the protective covering.

Figure 6:
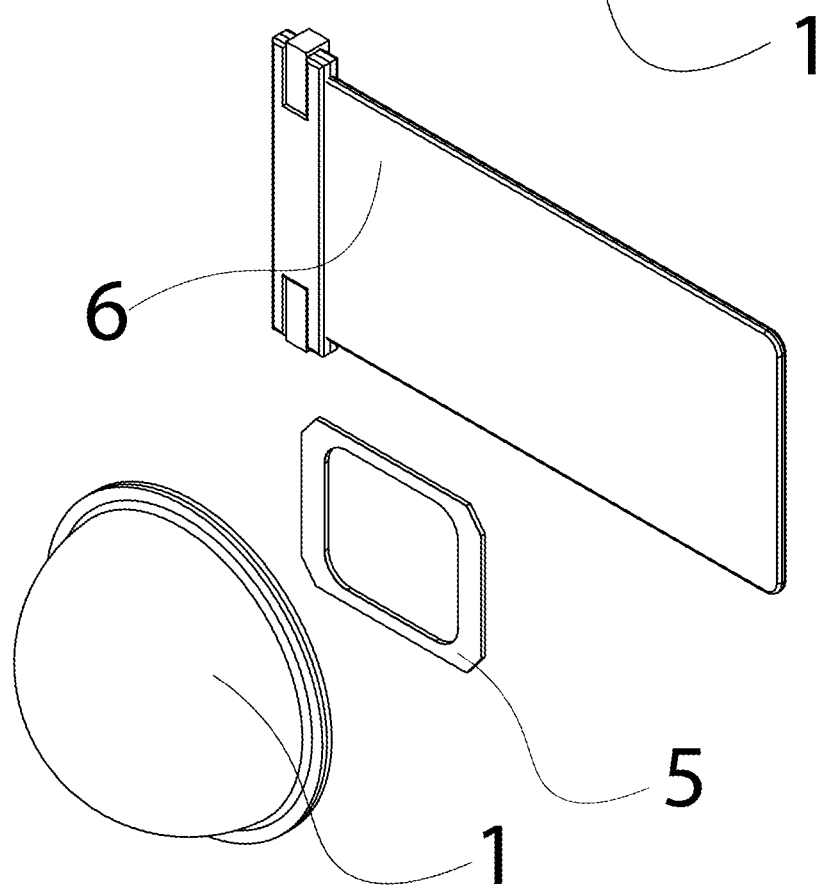
FIG. 6 illustrates components of a sealed-dome apparatus configured to be affixed to a planar surface in accordance with aspects of the present disclosure.

FIG. 6 illustrates an exploded view of a sealed-dome apparatus configured to be affixed to a planar surface in accordance with aspects of the present disclosure. The exploded view of FIG. 6 shows the components of the sealed-dome lens of FIG. 5 including transparent outer lens 1, double-sided adhesive layer 5, and planar surface 6.

Figure 7:
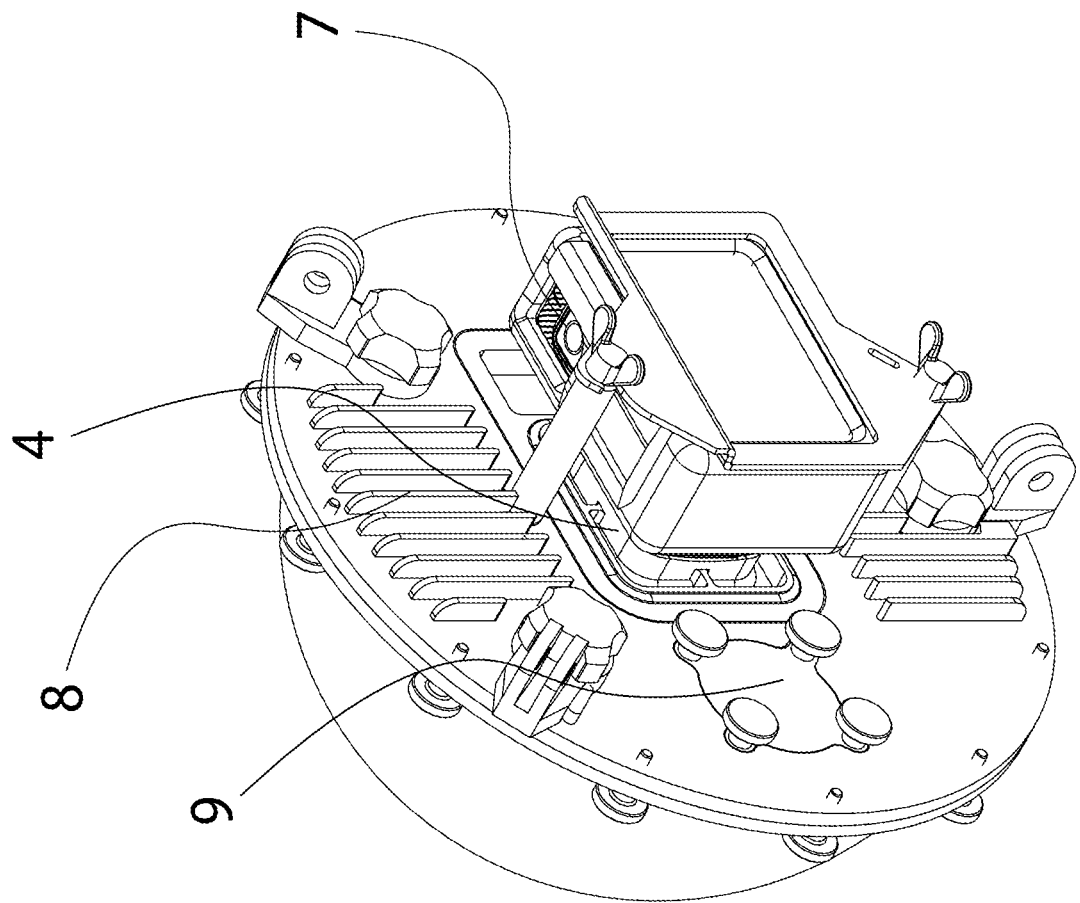
FIG. 7 illustrates sealed-dome apparatus affixed to a recording devices in accordance with aspects of the present disclosure.

FIG. 7 illustrates sealed-dome apparatus affixed to a recording device in accordance with aspects of the present disclosure. A sealed-dome lens may include a transparent outer lens affixed to a backside use an affixing material configured to create a seal. The affixing material may be, but is not limited to adhesives means (e.g., such as a gel, glue, tape, etc.), mechanical means (e.g., screws, clips, clamps, threads, bolts etc.), combinations thereof, or the like. For example, the sealed-dome lens shown in FIG. 7 uses bolts to create a seal between the transparent outer lens and the backside. The affixing material may be permanent (e.g., such as adhesives, solvents, nets, etc.) or removable (e.g., such as bolts, clips, screws clamps, threads, etc.). The mechanical means may be positioned external to the sealed-dome lens or be part (e.g., inserts or the like) of the material the transparent outer lens and/or backside.

In some instances, the transparent outer lens and the backside may be sealed during the manufacturing process. For example, the transparent outer lens and the backside manufactured as a single component (e.g., a monolithic component, etc.). Alternatively, the seal may be created by a vacuum within the sealed cavity. During manufacturing, the air within sealed cavity formed by the transparent outer lens and the backside may be removed. The resulting vacuum may act as a physical force on the transparent outer lens and the backside that maintains the seal.

Figure 8:
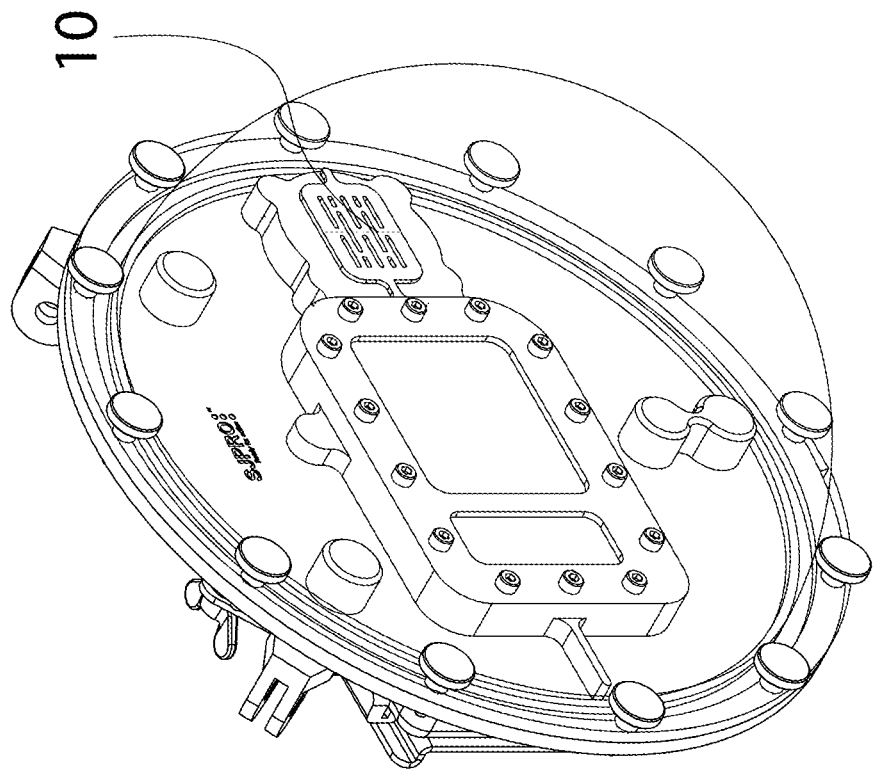
FIG. 8 illustrates alternative view of the sealed-dome apparatus of FIG. 7 in accordance with aspects of the present disclosure.

FIG. 8 illustrates alternative view of the sealed-dome apparatus of FIG. 7 in accordance with aspects of the present disclosure. The backside may include non-transparent portion (e.g., made up of a metal such as aluminum, a plastic, etc.) and a transparent portion. In some instances, such as shown, the transparent portion may be formed by covering a hole in the non-transparent portion with glass, plastic, crystal, another transparent material, a fitting (e.g., such as a plate or the like) having a transparent portion fitted over the hole (e.g., secured with a fixation material). In other instances, other such transparent materials or fittings may be positioned over the hole to create a sealed backside with a transparent portion.

Returning to FIG. 7, the backside may include sealing mechanism 4 configured to create a seal between a recording device 7 and the backside. Sealing mechanism 4 may be a gasket made from silicon, rubber, or any other material configured to create a water-tight seal. The gasket may include an adhesive to cause the gasket to adhere to the recording device and maintain the integrity of the seal when forces are applied (e.g., movement, etc.). Additional fixation materials (as previously described) may be used to maintain a connection between the sealed-dome lens and the recording device.

The sealed-dome lens may be configured for use in single or dual-media environments (e.g., open-air, partially submerged in water, underwater, etc.). Some environments may have characteristics that may impact the operation of the recording device. For example, excess heat or humidity may cause warping or fogging to occur on the inside surfaces of the sealed-dome lens, which may impact the quality of images or video captured by the media device. The sealed-dome lens may include one or more removable and/or permanent attachments configured to manage environmental conditions.

For example, as shown in FIG. 7, the backside may include a non-transparent portion which may accommodate one or more environmental control features. In some instances, an environmental control feature may include heatsinks such as heatsink 8. Heatsinks 8 may be made from a conductive material such as aluminum, a variant thereof, or the like to draw heat away from the sealed cavity. By removing excess heat, the heatsinks prevent moisture in the air within the sealed cavity from condensing along the inner surface of the sealed-dome lens (e.g., such as when the temperature outside is lower than the temperature of the sealed cavity, etc.). In some instances, the backside may be manufactured from a conductive material (e.g., the same or different conductive material of heatsinks 8). In other instances, the backside may be manufactured from a non-conductive material (e.g., such as plastic or the like) and heatsinks 8 can be attached thereto to provide temperature management.

In some instances, the backside may be fitted with multiple environmental control features. For example, the backside of FIG. 7 and FIG. 8 includes heatsink 8 and chamber 9. Chamber 9 may be positioned on the inside surface of the backside and provide selective access to the sealed cavity for accessing sensors, absorbent materials, and/or the like. The chamber may be sealed using a plate secured to the backside using a fixation material (such as any of the previously described fixation materials). The plate and/or the fixation material may include a gasket to create a seal and maintain the sealed cavity. The opposing surface 10 (of FIG. 8) of chamber 9 from the plate opening may include one or more openings exposing the contents of chamber 9 to the sealed cavity. For example, the opposing surface may include a single opening, multiple openings (e.g., such as holes or slots as shown, etc.), or the like. Multiple smaller holes may enable the absorbent material to be pushed into chamber 9 without risking the material from being pushed into the sealed cavity.

One or more sensors, absorbent materials, or the like may be placed inside the chamber and exposed to the sealed cavity. Examples of sensors include, but are not limited to hygrometers, temperature sensors, accelerometers, barometers, etc. Examples of absorbent materials include but are not limited to silica gel, fabric, pads (e.g., made from an absorbent materials), any other material configured to absorb moisture. The absorption may be passive (e.g., the material is left to absorb moisture passively over time) or active (e.g., using a pump, vacuum, or other air circulation means to force air over the absorbent material to increase a rate of absorption). Chamber 9 may be accessed to replace saturated absorbent material.

Chamber 9 may be part of the backside or attached thereto. The shape and/or orientation of chamber 9 may be selected based on the sensors and/or absorbent materials intended to reside inside chamber 9 or based on the size of the sealed-dome lens. The location of the chamber relative to the backside may also be selected based on the sensors and/or absorbent materials intended to reside inside chamber 9 or based on the size of the sealed-dome lens. For example, the location of a larger chamber may be selected to ensure the integrity of the backside is not compromised by the openings needed to access chamber 9.

Backside may be fitted with zero or more environmental control features. The sealed-dome apparatus of FIG. 7 and FIG. 8 includes two such environmental control features (heatsinks 8 and chamber 9). Backsides may be fitted with just heatsinks 8 or just chamber 9. The environmental control features may be attached during use of the sealed-dome lens (based on characteristics of the particular environment in which the sealed-dome lens is to be used) or during manufacturing.

Figure 9:
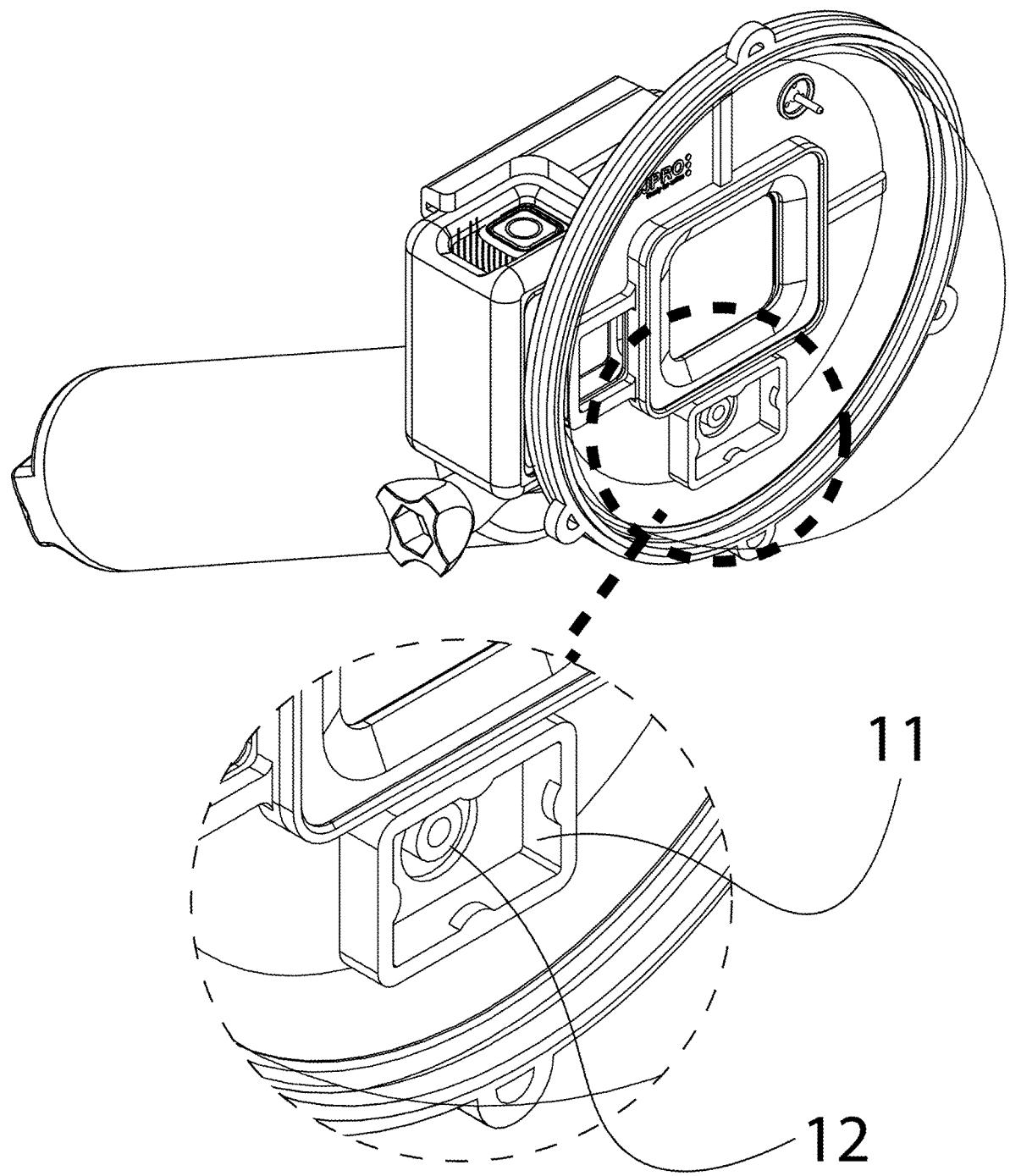
FIG. 9 illustrates a backside of a sealed-dome apparatus including sensors configured to detect characteristics within the sealed-dome in accordance with aspects of the present disclosure.

FIG. 9 illustrates an internal surface of a backside of a sealed-dome apparatus including a chamber for sensors and/or absorbent materials configured to detect characteristics within the sealed-dome in accordance with aspects of the present disclosure. The depicted sealed-dome apparatus includes a variation of chamber 9 positioned below the transparent portion of the backside. The backside may be made from a sealing material such as a rubber or silicon so as to create a seal between the transparent outer lens and the backside. The sealing material may also enable creating a seal with the transparent portion and form a seal with a chamber 11. Chamber 11 may accept sensors and/or absorbent materials (as previously described), lugs or other fixation materials may be used to ensure the sensors and/or absorbent materials are maintained with chamber 11. In some instances, cavity 12 may be provided. Component 12 may be accessible by the opposing surface. A force exerted on the opposing surface causes a portion of component 12 to protrude into chamber 11 and exert a force on the sensors and/or absorbent materials (e.g., to push the sensors and/or absorbent materials out of chamber 11). For example, when an absorbent material becomes saturated, the backside may be separated from the transparent outer surface. A force may be exerted on component 12 to push the saturated absorbent material out of chamber 11. a new absorbent material may be placed into chamber 11 and the backside may be reattached to the transparent outer surface.

Figure 10:
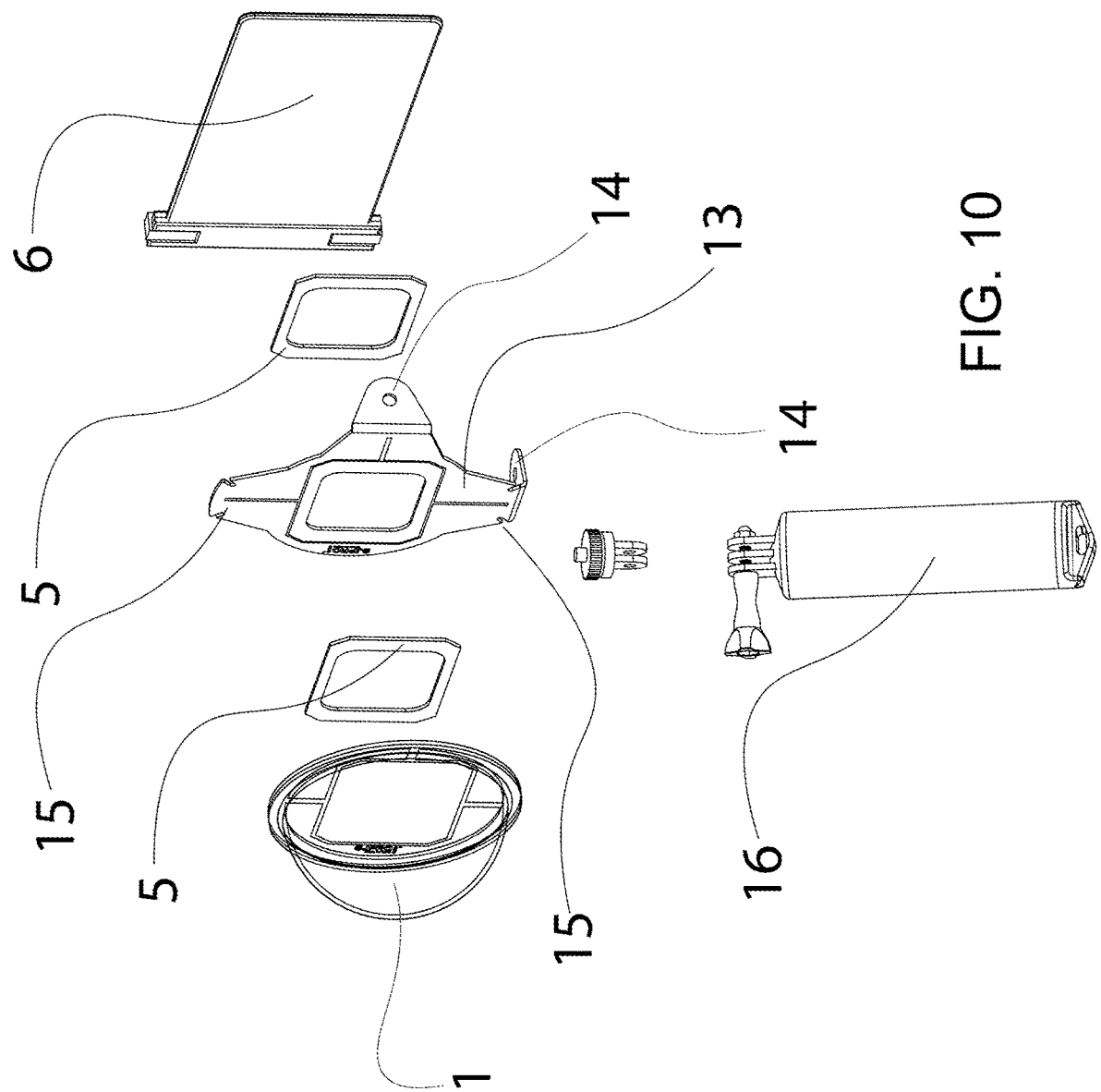
FIG. 10 illustrates an exploded view of a sealed-dome apparatus and a surface in which the sealed-dome apparatus may be affixed in accordance with aspects of the present disclosure.

FIG. 10 illustrates an exploded view of a sealed-dome lens and a surface in which the sealed-dome apparatus may be affixed in accordance with aspects of the present disclosure. The sealed-dome lens may include a transparent outer surface 1 with a backside attached. A double-sided adhesive layer 5 may be positioned on the opposing surface of the backside to create a sealed space between the backside and plate 13. Plate 13 may be configured to connect one or more accessories to increase the use and efficiency of the sealed-dome lens. Plate 13 includes attachment points 14 that connect to the various accessories. Examples of such accessories include, but are not limited to a flashlight, sun cover, a handle or handhold 16, a trigger, control buttons for controlling the recording device, a flash, a screen, a level (configured to indicate and/or control an orientation of plate 13, etc.). Attachment points 14 may accept accessories directly (e.g., via a standardized connection mechanism) or may accept an adapter that is configured to connect to the accessories. Plate 13 may comprise one or more molded materials (e.g., such as plastics, metals such aluminum, etc.).

Another double-sided adhesive layer 5 maybe positioned on an opposing surface of plate 13 (from the sealed-dome lens) for establishing a seal with planar surface 6 of the protective covering of the recording device. Alternatively, the seal may be formed directly with the recording device (e.g., if the recording device is waterproof). Notches 15 on plate 13 may be used to reinforce the sealed-dome lens to the recording device. For example, flexible cord can be positioned through the notches 15 at one end of plate 13 and positioned over accessories (if present) and/or the recording device returning to the notches 15 of the opposing end of plate 13. Notches 15 may be use other mechanical variants to chord. Notches 15 may also be used for other purposes (e.g., such as attaching accessories, etc.).

Figure 11:
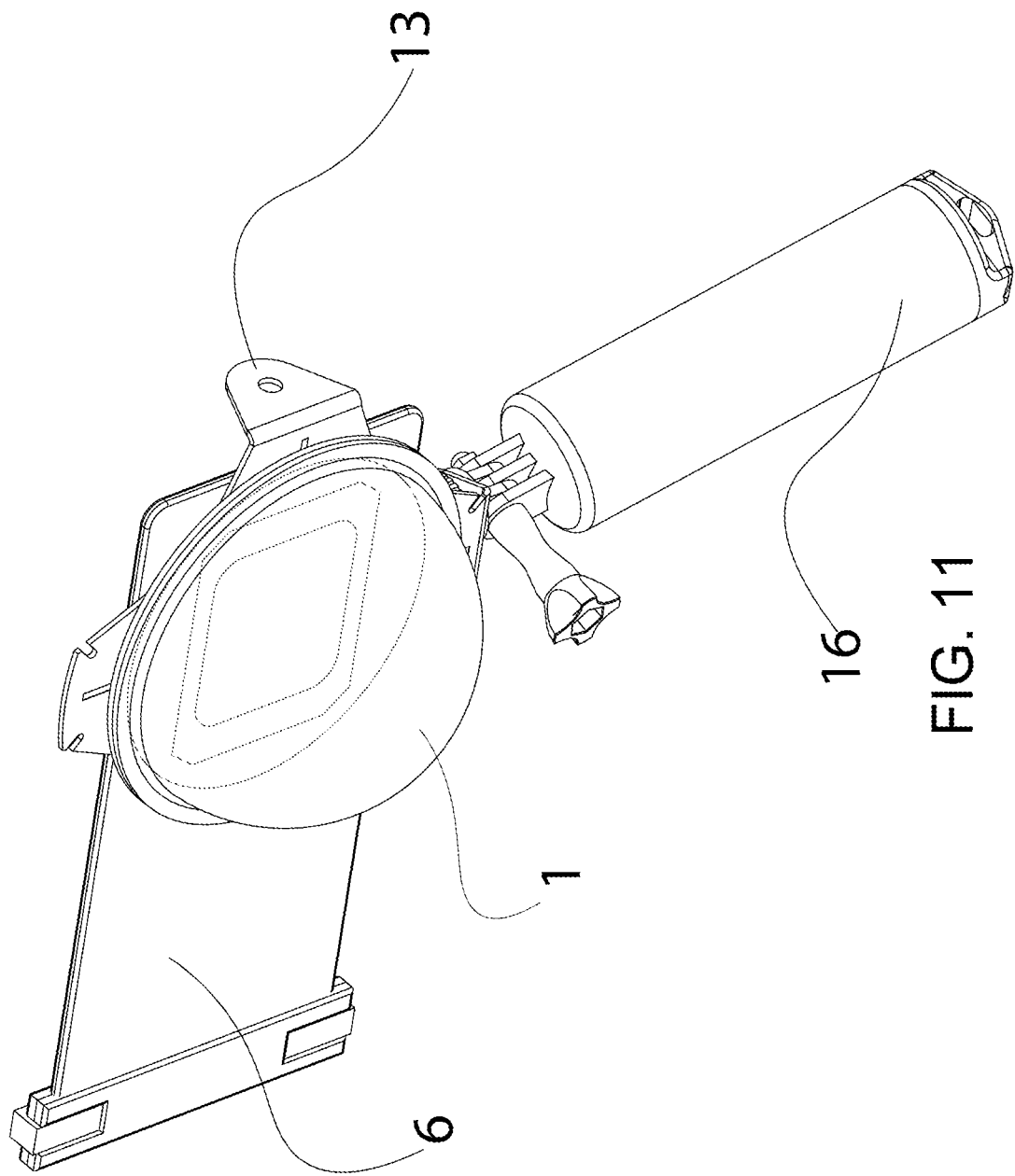
FIG. 11 illustrates another view of the sealed-dome lens of FIG. 10 in accordance with aspects of the present disclosure.

FIG. 11 illustrates another view of the sealed-dome lens of FIG. 10 in accordance with aspects of the present disclosure. The sealed-dome lens includes handle 16 accessory. Handle 16 is attached to plate 13 using a locking screw. The locking screw can be used to loosen the connection between handle 16 and plate 13. While in a loosened state, the handle can pivot relative to plate 13. Once a particular position of handle 16 is identified, the locking screw can be tightened to maintain the particular position of handle 16 relative to plate 13. Handle 16 is one example of an accessory that can be attached to plate 13. Other accessories may be attached to plate 13 (e.g., using another attachment point 14) in addition to or in place of handle 16. Furthermore, the locking screw may be one mechanism to lock the position of handle 16. Other fixation materials may be used to connect handle 16 to plate 13.

FIG. 12 illustrates a recording-device handling system for use in various environments in accordance with aspects of the present disclosure. The recording-device handling system may include elastic clip 17 for attaching and/or supporting a recording device. Elastic clip may include a u-shaped material (e.g., such as a plastic, metal, or the like. The ends of the u-shaped material may be pushed into each other by the u-shaped bend. The force exerted on the ends of the u-shaped material may be sufficient to allow the ends of the u-shaped material to firmly hold an object placed therebetween (e.g., such as a recording device, protective covering, etc.).

Surface 18 may be a surface of elastic clip 17 comprising a sealing material (e.g., rubber, silicon, etc.). Surface 18 may include an adhesive to adhere the sealing material to elastic clip 17. A recording device may be positioned between the ends of the u-shaped material to hold the recording device firmly such that a lens of the recording device is positioned over the transparent portion of the sealed-dome lens. Pressure exerted by the u-shaped ends may be sufficient to create a seal between the recording device and surface 18. Alternatively, a sealing material and/or adhesive may be used ensure a seal between the recording device and surface 18. Elastic clip 17 may include attachment points 14 for added accessories. For example, handle 16 may be attached to elastic clip 17 allow for a handhold.

Figure 13:
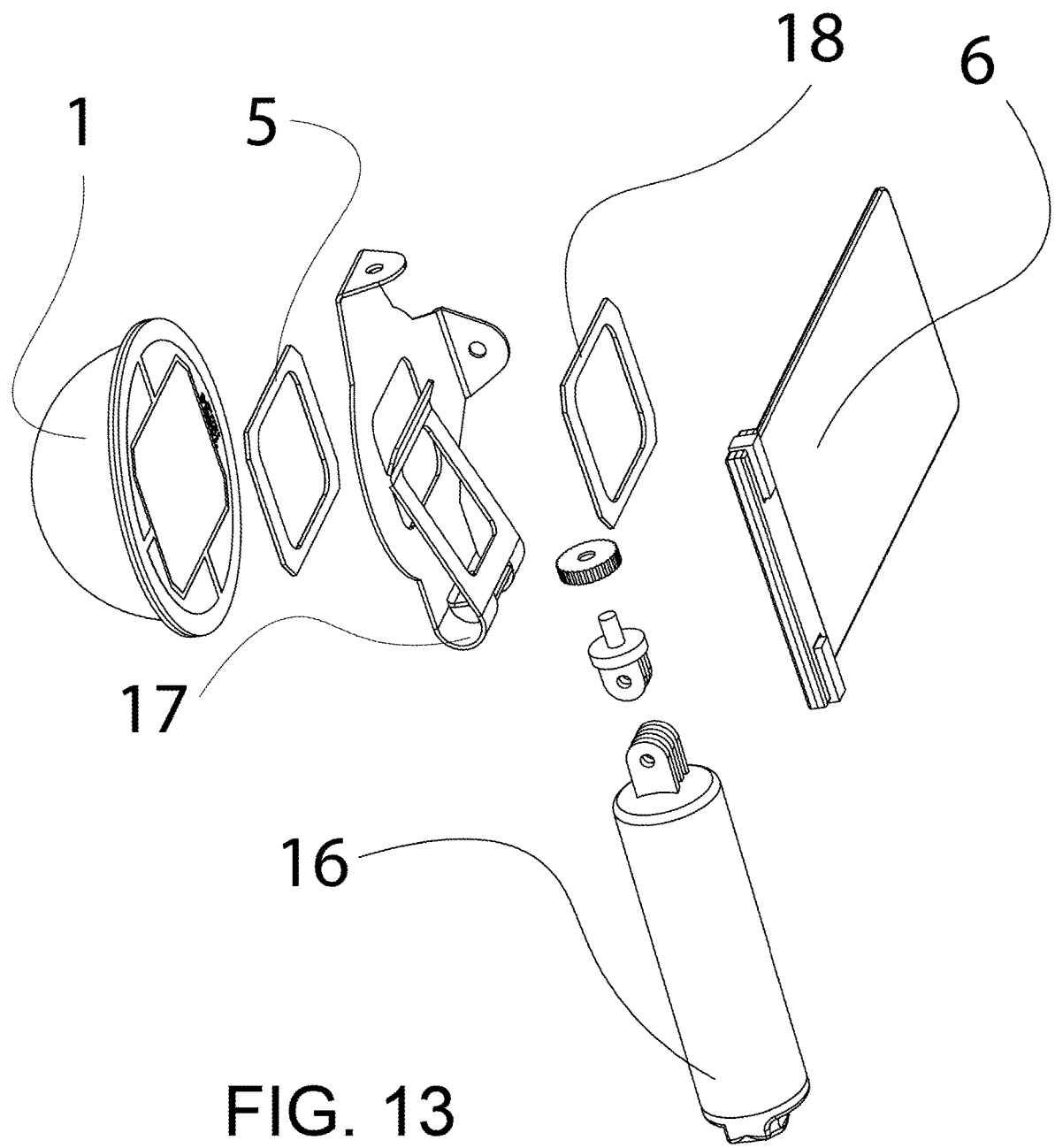
FIG. 13 illustrates an exploded view of a recording-device handling system of FIG. 12 comprising a sealed-dome apparatus in accordance with aspects of the present disclosure.

FIG. 13 illustrates an exploded view of a recording-device handling system of FIG. 12 comprising a sealed-dome apparatus in accordance with aspects of the present disclosure. The exploded view includes sealed-dome lens 1 with backside, a double-sided adhesive layer 5 to create a seal between a surface of elastic plate 17 and the sealed-dome les, surface 18 (e.g., a sealing material) secured the opposing surface of elastic clip 17 from the double-sided adhesive layer 5, planar surface 6 (e.g., a protective covering of a recording device), and handle 16 for controlling the orientation of the recording-device handling system when operating the recording device. Surface 18 may include one side with an adhesive (to attach surface 18 to elastic clip 17), and an opposing side without adhesives. The force exerted by the u-shaped ends may be sufficient to create a seal between surface 18 and planar surface 6. Alternatively, both sizes of surface 18 may include an adhesive. Elastic clip 17 may accept an upper portion of a hinge assembly that connect to a lower portion of the hinge assembly attached to handle 16. A locking screw may be used to lock the hinge assembly into a particular orientation (e.g., such that handle 16 is preventing from moving relative to elastic plate 16). Other connection materials may be used in addition to or in place of the locking screw and hinge assembly.

Figure 14:
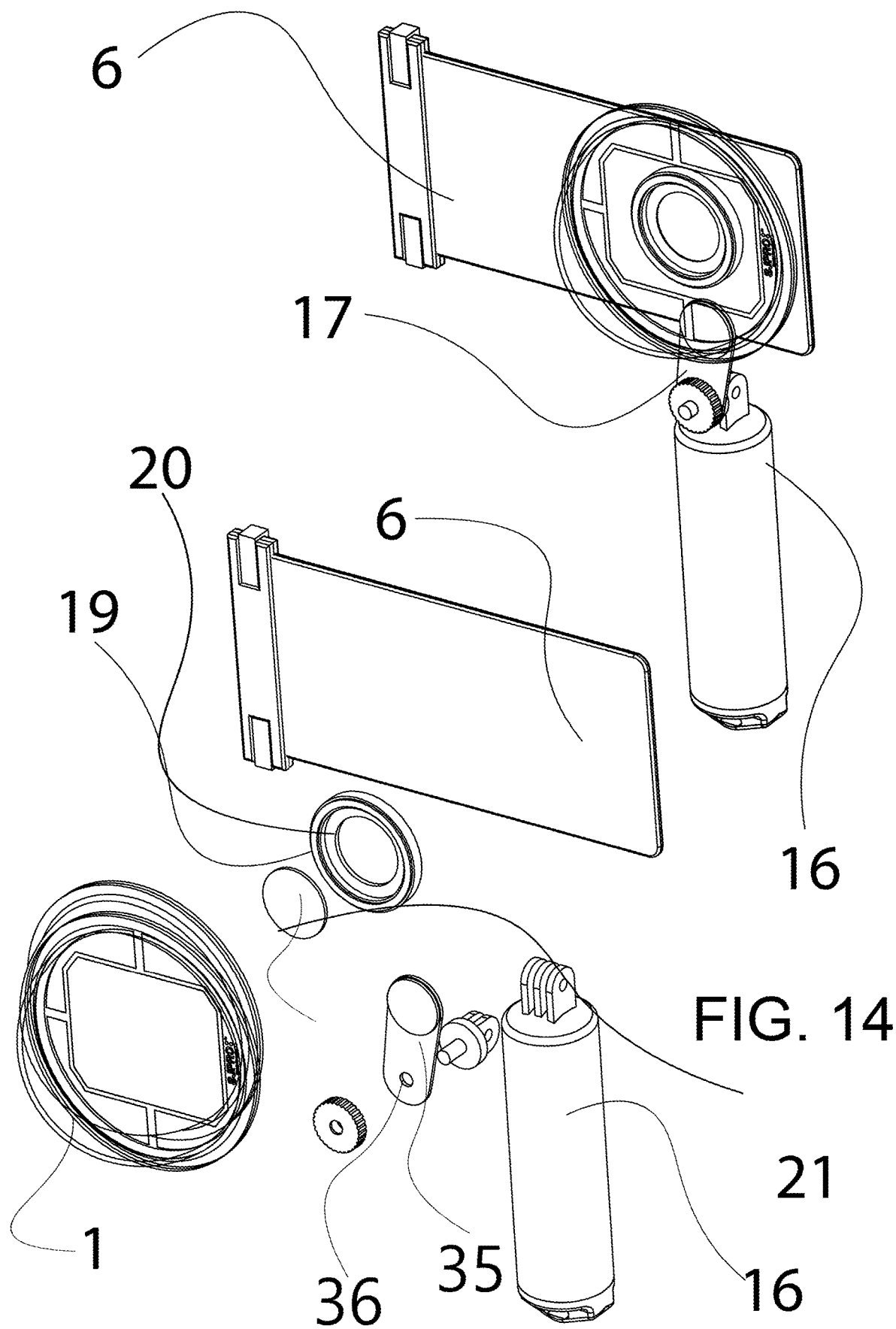
FIG. 14 illustrates another exploded view of a recording-device handling system with an added fish-eye lens in accordance with aspects of the present disclosure.

FIG. 14 illustrates another exploded view of a recording-device handling system with an added fisheye lens in accordance with aspects of the present disclosure. A fisheye lens may be positioned between the sealed-dome lens and planar surface 6 of the protective covering of the recording device. Adapter 20 may be positioned on the external surface of the backside using adhesive material 19. Another adhesive material may be positioned on the opposing surface of adapter 20 to connect adapter 20 to planar surface 6. Alternatively, or additional, other fixation materials may be used to secure adapter 20 (e.g., such as screws, bolts, etc.). The size and/or shape of adapter 20 may be selected based on the particular size and/or shape of the lens that is being added. A fisheye lens 21 (or other type of lens) can be inserted into adapter 20. Adapter 20 may hold fisheye lens 21 in place. Once connected to planar surface 6, fisheye lens 21 may be protected from the environment and from forces that may cause the fish-eye lens 21 to move relative to adapter 20.

Plate 35 may be connected to planar surface 6 or to the backside of the sealed-dome lens using a fixation material (e.g., such as an adhesive, etc.). Plate 35 may be part of an assembly that includes one or more attachment points as previously described. For example, plate 35 may include a hole 36 for connect an upper portion of a hinge assembly. The lower portion of the hinge assembly may be connected to handle 16. The upper portion of the hinge assembly may interface with the lower portion of the hinge assembly. A locking screw may be used to lock the position of the hinge (e.g., to prevent movement of handle 16 relative to plate 35.

Figure 15A:
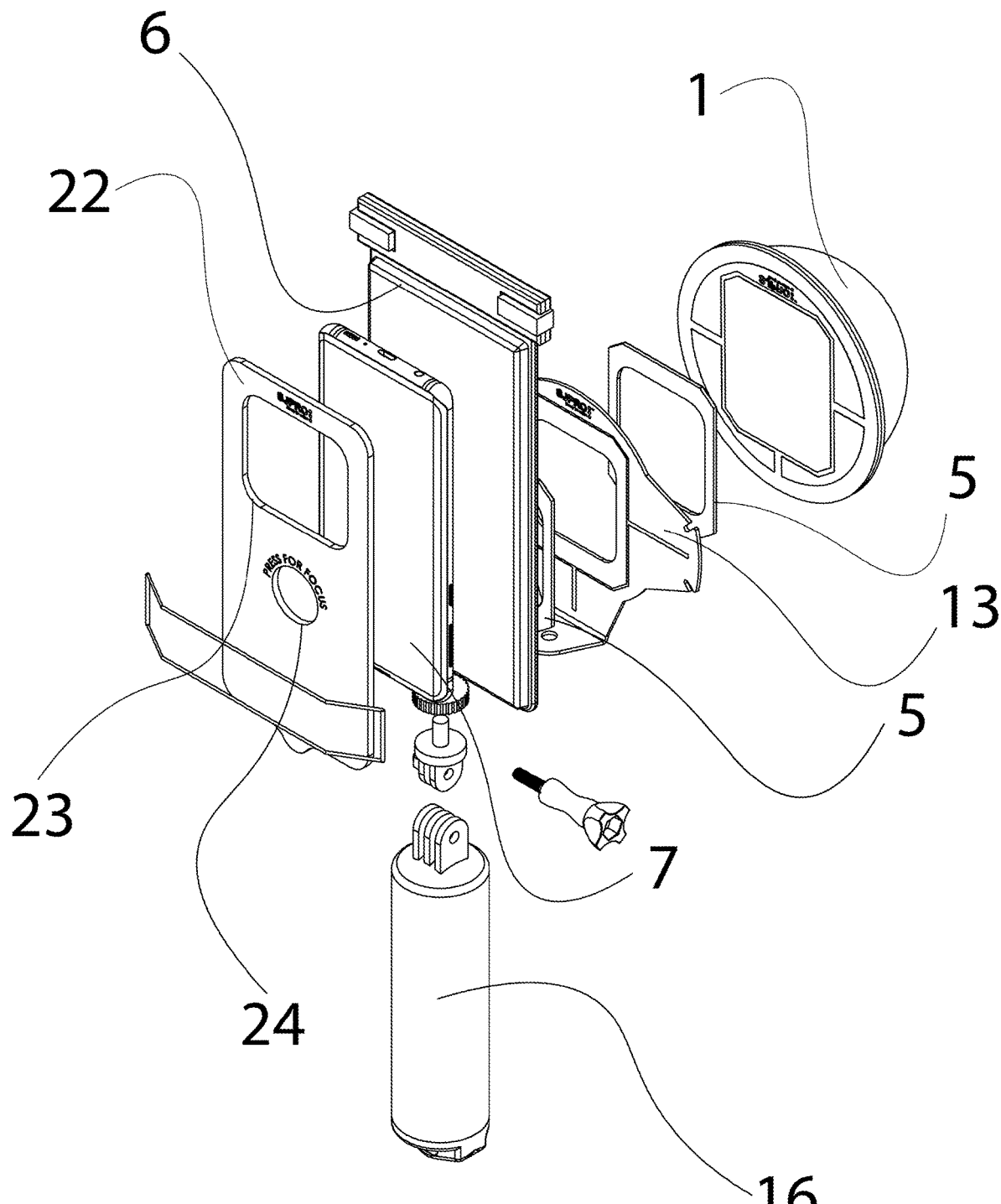
FIG. 15A illustrates an exploded view of a recording-device handling system for use with mobile devices in accordance with aspects of the present disclosure.

FIG. 15A illustrates an exploded view of a recording-device handling system for use with mobile devices in accordance with aspects of the present disclosure. The recording-device handling system includes a sealed-dome lens, a double-sided adhesive layer 5 configured to create a seal between the sealed-dome lens and plate 13, plate 13, a double-sided adhesive layer 5 configured to create a seal between plate 13 and planar surface 6 (of a protective covering for a recording device, planar surface 6 (e.g., a surface of a protective covering that also includes space plate 22), recording device 7 (e.g., a mobile device), a space plate 22 (e.g., an opposing surface of the protective covering), an opposing surface of the protective cover (not shown), and handle 16 (connected via a hinge assembly as previously described).

Recording device 7 may be operated using a touch-sensitive display (e.g., capacitive touch, etc.). Underwater, touch-sensitive displays may not be operable due to water being a conductor and the protective layer insulating the display from the user's fingers. Space plate 22 creates an airgap between an opposing surface of the protective cover and the touch-sensitive display. The opposing surface may be made from a flexible material that can be manipulated. By pressing into an external surface (e.g., using a finger, shaft, etc.) of the opposing surface, the inner surface of the opposing surface may pass through the airgap to contact the touch-sensitive display of recording device 7.

Space plate 22 may create an airgap over the entire touch-sensitive display or only a portion thereof. For example, a first portion of the touch-sensitive display may display images and/or video captured by a camera of recording device 7 and second portion of the touch-sensitive display may display icons that can be selected to control the operation of the display. In some instances, space plate 22 may create an airgap over just the second portion of the touch-sensitive display (e.g., since only the second portion of the touch-sensitive display has icons that can be interacted with). For example, space plate 22 can create a cavity 24 over a center of the touch-sensitive display. Interacting with cavity 24 (through the opposing surface) may enable a user of the recording device to focus a camera of recording device 7. In other instances, space plate 22 may be configurable to create an airgap over any portion of the touch-sensitive display. Space plate 22 may include a spacing mechanism (e.g., silicon, rubber, plastic, etc.), positioned around a perimeter of space plate 22. Space plate 22 may also include one or more spacing mechanisms that can be selectively positioned to create an air gap over any particular area of the touch-sensitive display.

Figure 15B:
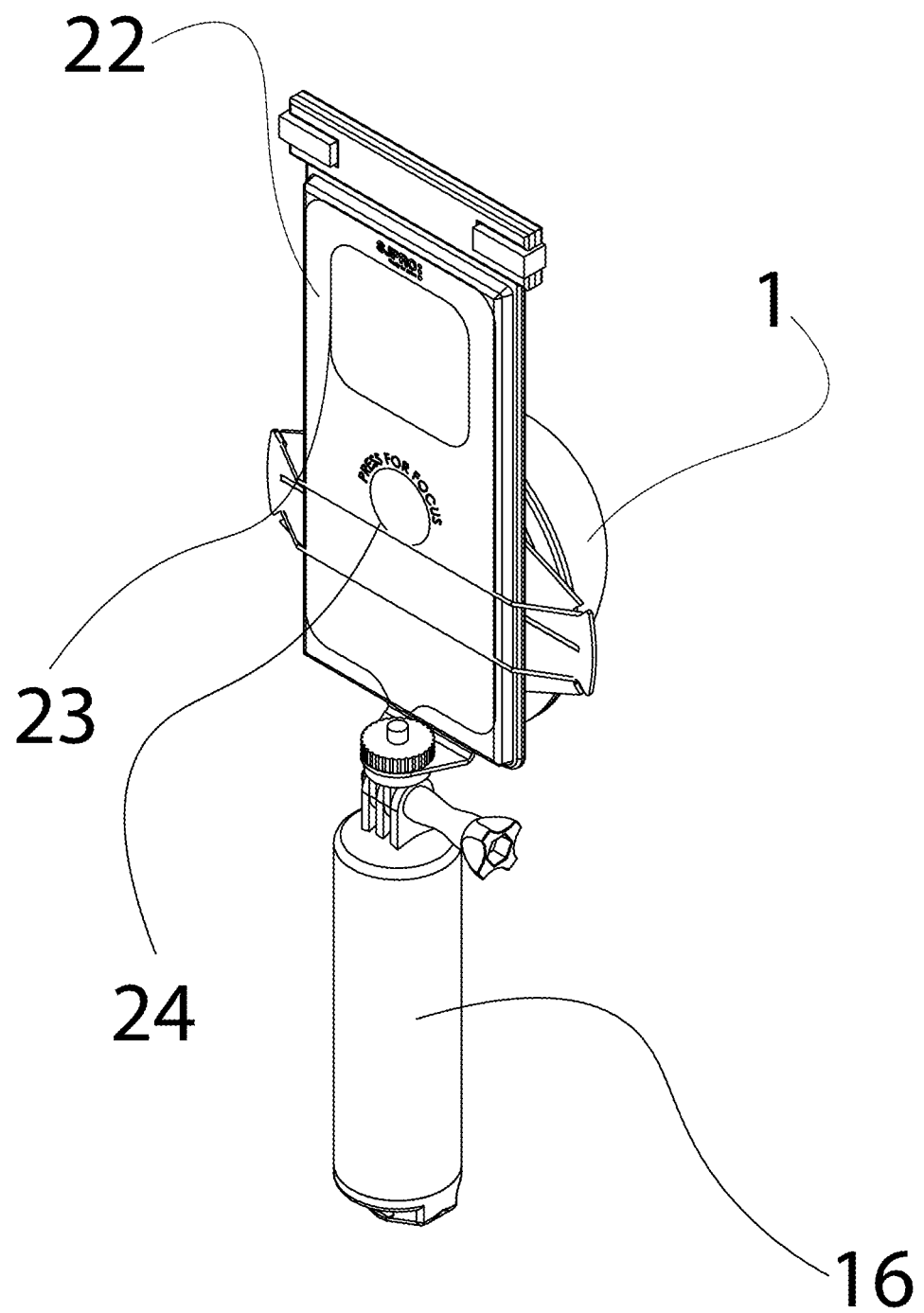
FIG. 15B illustrates a view of the recording-device handling system of 15A accordance with aspects of the present disclosure.

FIG. 15B illustrates a collapsed view of the recording-device handling system of 15A accordance with aspects of the present disclosure. Space plate 22 may create an airgap that enable use of a touch-sensitive display of a mobile device (e.g., recording device 7). Space plate may comprise a transparent material (e.g., such as, but not limited to a plastic, silicone, or the like). A user may press into the opposing surface of the protective covering (e.g., positioned over space plate 22 and connected to planar surface 6 to create a water-tight seal that prevents water from touching recording device 7) causing the opposing surface to pass through the airgap of cavity 23 to interact with the controls of the touch-sensitive display.

Figure 16:
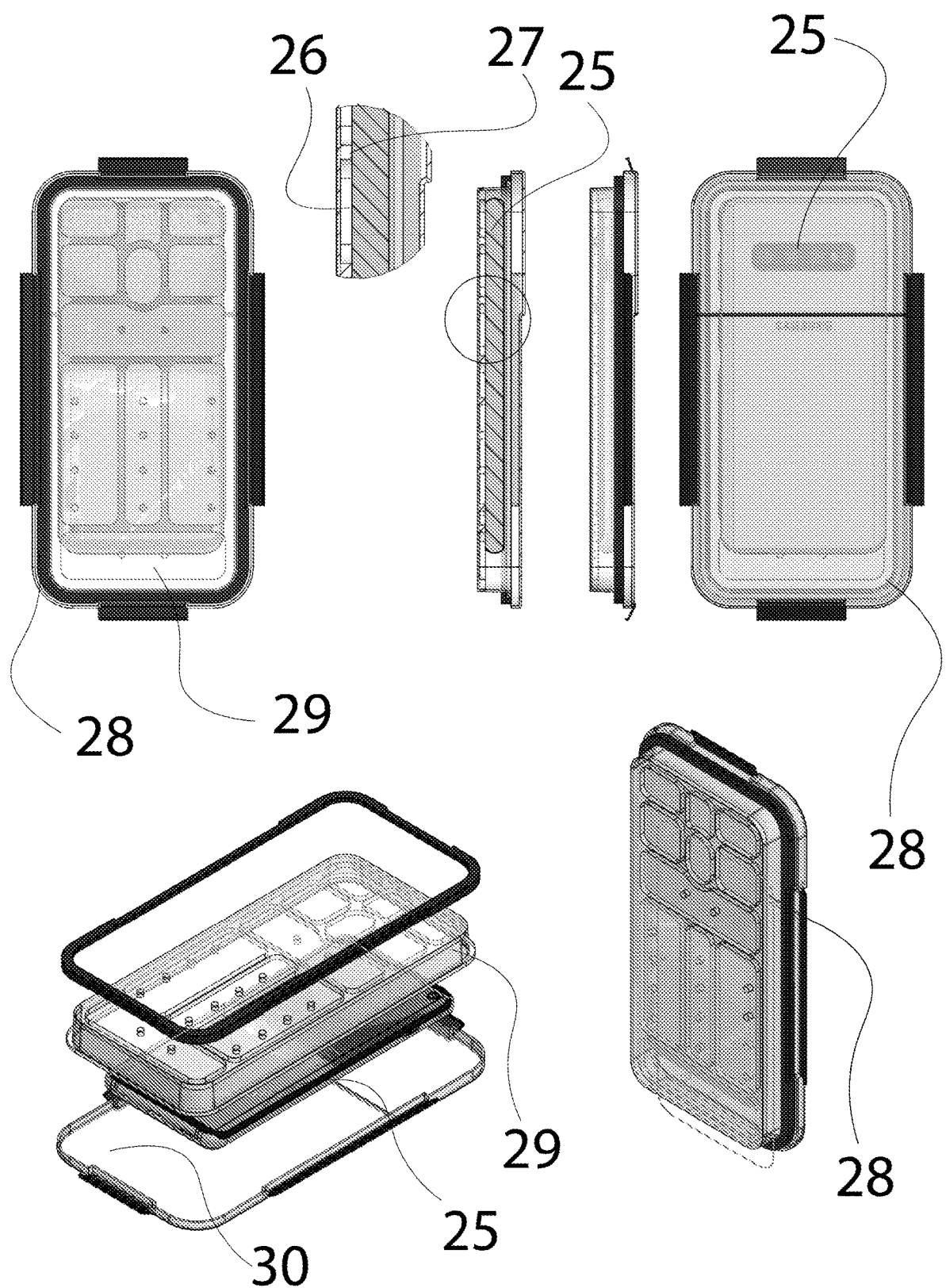
FIG. 16 illustrates a protective covering for mobile devices enabling use in various environments in accordance with aspects of the present disclosure.

FIG. 16 illustrates a protective covering for mobile devices enabling use in various environments in accordance with aspects of the present disclosure. A protective covering 28 (e.g., such as a case, bag, etc.) for mobile devices may be sealed to prevent water or other environmental particulates from contacting the mobile device. The protective covering may include a flexible surface positioned over a touch-sensitive display of the mobile device. A user may interact with flexible surface to cause flexible layer to contact the touch-sensitive display allowing operation of the mobile device while the mobile device is positioned within the protective cover. The protective covering may be greater than or equal to the size of the mobile device. In some instances, a protective covering that is larger than the mobile device may accommodate mobile devices of various sizes. The mobile device may be positioned within a particular portion of the protective covering. For example, as shown gap is present at the lower portion of the protective covering. A profile view of the protective covering illustrates a first density 26 and a second density 27 of flexible surface 29 as well as and the profile view of the mobile device.

The protective covering may comprise a transparent material (e.g., such as plastic, silicone, etc.). The transparent material enables light to reach the lenses 25 of the mobile device enabling the mobile device to operate as recording device 7 (as previously described) to capture images and/or video of mixed-media environments. The protective covering may be comprised of a rear surface 30, a mixed-density flexible layer (26, 27, and 29), and a front surface (e.g., a flexible surface).

Figure 17:
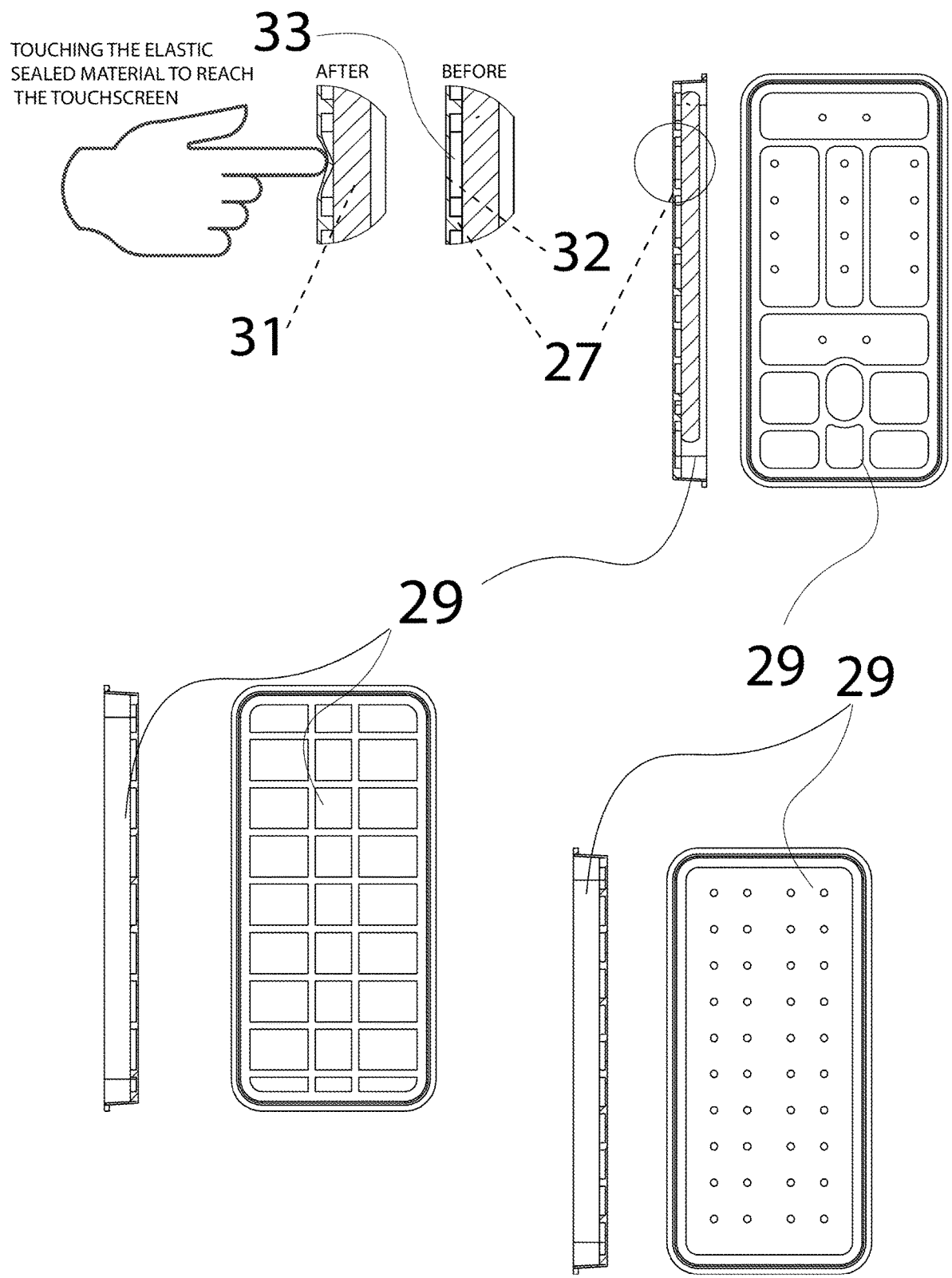
FIG. 17 illustrates aspects of a protective covering for mobile devices enabling use of touch-based operation of the mobile device within various environments in accordance with aspects of the present disclosure.

Flexible layer 29 may create a gap between the front surface and the touch-sensitive display to enable interacting with the touch-sensitive display. Flexible layer 29 may comprised of a material (e.g., such as a plastic, silicone, a gel, etc.) that creates an airgap between the flexible surface and the touch-sensitive display. Alternatively, flexible layer 29 may be comprised of a memory gel material that can be compressed when an external force is applied (as shown in FIG. 17). Exerting a force on the flexible layer causes the gel to be temporarily compressed and causing activation of a function of touch-sensitive display or activation of a button (if physical buttons are present). When the force is removed, the gel will revert to the initial state (e.g., before the force was applied).

The flexible layer may comprise various densities to enable interaction with portions of the touch-sensitive display and preventing interaction with other portions of the touch-sensitive display. For example, a first density 26 (or thickness) may be a low-density that enable interaction, while a second density 27 (or thickness) may be a high-density that prevents interaction. Operation of the touch-sensitive display may be difficult in some environments (e.g., underwater, when using gloves, etc.). By varying the densities of flexible layer 29, the protective covering can prevent accidental interactions (e.g., activating the wrong icon, etc.). In some examples, the portion of flexible layer 29 that is at the first density 26 may be positioned over areas of the touch-sensitive display used to operate camera functions (e.g., camera settings, focus, etc.), while the portion of flexible layer 29 that is at the second density 27 may positioned over areas of the touch-sensitive display that may display the camera feed. The mobile device may be selectively positioned by a user within the protective covering relative to the flexible layer 29 so as to position the portion of flexible layer 29 that is at the first density 26 and the portion of flexible layer 29 that is at the second density 27 over particular portions of the touch-sensitive display.

FIG. 17 illustrates aspects of a protective covering for mobile devices enabling use of touch-based operation of the mobile device within various environments in accordance with aspects of the present disclosure. The protective covering of FIG. 17 includes a flexible layer 29. The flexible layer 29 may be positioned over the entire touch-sensitive display 31 or over particular areas of touch-sensitive display. In some instances, the flexible layer 29 may be positioned over the entire touch-sensitive display 31 but include various densities to control operation of the touch-sensitive display. For example, the flexible layer 29 may include various densities (or thicknesses) to enable interaction of particular areas of the touch-sensitive display 31 while preventing interaction with other areas of the touch-sensitive display.

Flexible layer 29 may be a material that creates an airgap between the front surface and the touch-sensitive display (e.g., using spacers comprising plastic, rubber, silicone, gels, etc.). Alternatively, flexible layer 29 may comprise a compressible material (e.g., silicone, gel, etc.) that may be compressed to contact the touch-sensitive display.

In the "before" view illustrates an example flexible layer 29 in an initial state in which no force is being applied. The example flexible layer 29 includes a second density 27 (or thickness) configured to prevent contact with the touch-sensitive display and a third density 32 (or thickness) configured to enable contact with the touch-sensitive display. An airgap 33 may be formed by flexible material 29 using material at the third density 32. In the "after" view, a force is applied to the front surface causing the flexible layer 29 to compress and contact touch-sensitive display 31. Once the force is removed, the flexible layer 29 may return to the "before" view.

Flexible layer 29 may be comprised of cells material at the third density (or thickness). The cells may be made up of any shape such as a squares (as shown), rectangles (as shown), circles, rings, or any polygon. The cells may be of a uniform size and shape or of varying sizes and shapes. In some instances, the cells may be arranged in a grid pattern. In other instances, the cells may in any particular pattern or orientation (waves, rings, etc. In between the cells is material at the second density (or thickness) to prevent accidental interaction with the touch-sensitive display. For example, FIG. 17 depicts various flexible layers 29 with various cells orientations.

Figure 18:
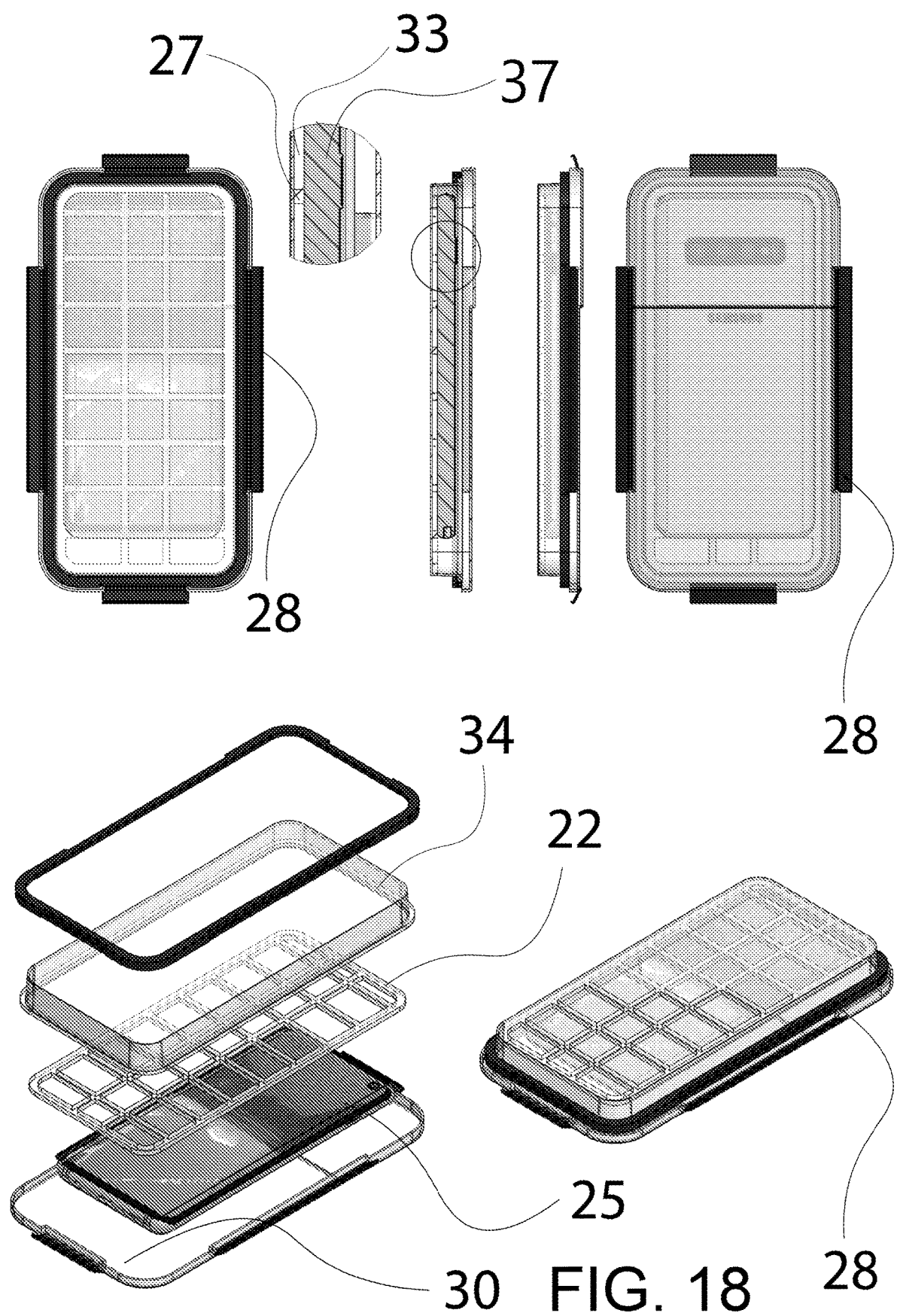
FIG. 18 illustrates additional aspects of a protective covering for mobile devices in accordance with aspects of the present disclosure.

FIG. 18 illustrates additional aspects of a protective covering for mobile devices in accordance with aspects of the present disclosure. Protective covering 28 may provide a waterproof (also referred to as a water-tight) seal preventing water and other environmental particulates from entering protective covering 28. Protective covering 28 of FIG. 18 may include a perimeter space plate 34 and space plate 22. The combined flexible layer 34 and space plate 22 enable use of the touch-sensitive display in mixed-media environments (e.g., in dry environments, in rain, underwater, etc.). The flexible layer 34 may include various densities or thicknesses to allow particular interactions with the touch-sensitive display. As shown, material at the second density 27 (e.g., a high density or thickness) may prevent interaction with the touch sensitive display. Material at a low density or thickness (33 37) may enable particular interaction with the touch-sensitive display (e.g., 33) or buttons transposed on the side of the mobile device (e.g., 37).

The space plate 22 may create an airgap between front surface and the touch-sensitive display. The space plate 22 may comprise a hard or soft material (e.g., plastic, silicone, gel, etc.). A set of holes in the material may correspond to the location of airgaps formed by space plate 22. The holes may be any shape such as squares (as shown), rectangles (as shown), circles, rings, or any polygon. The holes may be of a uniform size and shape or of varying sizes and shapes. The perimeter space plate 34 maintains the airgaps formed by space plate 22 and the shape of the protective covering (e.g., preventing flexible material from accidental contacting touch-sensitive portions of the mobile device).

When assembled, a force exerted on the front surface (e.g., a flexible material) may cause the front surface to pass through the airgap and contact the touch-sensitive display. In some instances, the material of space plate may be positioned so as to create airgaps over areas in which interaction is acceptable and include material to prevent airgaps over areas in which interaction is to be prevented. In those instances, if a force is applied over a portion of space plate 22 lacking an airgap, then interaction may be prevented to prevent accidental interaction with the touch-sensitive display.

As described in connection with FIG. 16, FIG. 17, and FIG. 18, protective covering 28 and the layers therein (e.g., the flexible layer 29 and 34, space plate 22, front surface, rear surface 30, etc.) are partially or complete transparent to enable the mobile device to be used to capture images and/or video within mixed-media environments. Protective covering 28 may be usable with any of the previously described sealed-dome lens as described in connection to FIGS. 1-15. Furthermore, the features and/or components described therein may be combined, isolated, mixed and matched, etc. with any other feature and/or component described herein.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. An apparatus comprising:
   a transparent hemisphere including a base opposite an apex of the transparent hemisphere; and
   a substantially-planar surface configured to be positioned over a circumference of the base of the transparent hemisphere and affixed thereto creating a sealed cavity within the transparent hemisphere, wherein the substantially-planar surface includes:
      a transparent portion configured to allow light within an environment to pass through the transparent hemisphere and the transparent portion to reach a recording device; and
      an access port providing selective access to the sealed cavity.

2. The apparatus of claim 1, wherein the substantially-planar surface prevents a gas exchange between the environment and the sealed cavity.

3. The apparatus of claim 1, wherein the sealed cavity is a vacuum.

4. The apparatus of claim 1, further comprising:
   a gasket positioned between on a surface of the substantially-planar surface opposite the transparent hemisphere, wherein the gasket is configured to a seal between the substantially-planar surface and another surface.

5. The apparatus of claim 1, further comprising:
   a double-sided adhesive layer positioned on a surface of the substantially-planar surface opposite the transparent hemisphere, wherein the double-sided adhesive layer is configured to affix the substantially-planar surface to another surface.

6. The apparatus method of claim 1, wherein the substantially-planar surface is affixed to the transparent hemisphere with screws.

7. The apparatus of claim 1, wherein the substantially-planar surface is affixed to the transparent hemisphere with a double-sided adhesive.

8. The apparatus of claim 1, wherein the substantially-planar surface comprises:
one or more heatsinks configured to transfer heat from the sealed cavity to the environment.

9. The apparatus of claim 1, wherein a sensing device is positioned on a surface of the substantially-planar surface facing the sealed cavity.

10. The apparatus of claim 1, wherein a sensing device is positioned on a surface of the substantially-planar surface opposite the transparent hemisphere, the sensing device being configured to detect a presence of a liquid.

11. The apparatus of claim 1, wherein the access port enables removal of a sensing device positioned proximate to the access port.

12. The apparatus of claim 1, wherein the access port provides access to an environmental control material positioned proximate to the access port, the environmental control material configured to control one or more characteristics of the sealed cavity.

13. The apparatus of claim 1, wherein the substantially-planar surface is configured to be affixed to a recording device such that the transparent portion is positioned over a lens of the recording device.

14. The apparatus of claim 1, wherein the substantially-planar surface is configured to be affixed to a protective covering of a recording device, wherein when the recording device is encased within the protective covering, the transparent portion of the substantially-planar surface is positioned over a lens of the recording device.

15. The apparatus of claim 1, wherein the substantially-planar surface is configured to be removably affixed to another surface.

16. The apparatus of claim 1, wherein the transparent portion of the substantially-planar surface includes a non-reflective layer positioned thereon.

17. The apparatus of claim 1, further comprising:
a control plate positioned opposite the transparent hemisphere, the control plate including an attachment mechanism configured to receive one or more attachments.

18. The apparatus of claim 17, wherein the attachment mechanism is a hinge or a gimbal.

19. The apparatus of claim 1, wherein the environment is an underwater environment and wherein water from the underwater environment is prevented from entering the sealed cavity.

20. An apparatus comprising:
a transparent hemisphere including a base opposite an apex of the transparent hemisphere; and
a substantially-planar surface configured to be positioned over a circumference of the base of the transparent hemisphere and affixed thereto creating a sealed cavity within the transparent hemisphere, wherein the substantially-planar surface includes:
a transparent portion configured to allow light within an environment to pass through the transparent hemisphere and the transparent portion to reach a recording device; and
a sensing device positioned on a surface of the substantially-planar surface opposite the transparent hemisphere, wherein the sensing device being is configured to detect a presence of a liquid within the sealed cavity.

* * * * *